United States Patent
Wada et al.

(10) Patent No.: US 12,374,700 B2
(45) Date of Patent: Jul. 29, 2025

(54) ELECTRODE CATALYST, COMPOSITION FOR FORMING GAS DIFFUSION ELECTRODE, GAS DIFFUSION ELECTRODE, MEMBRANE ELECTRODE ASSEMBLY, AND FUEL CELL STACK

(71) Applicant: N.E. CHEMCAT CORPORATION, Tokyo (JP)

(72) Inventors: Yoshiyuki Wada, Tokyo (JP); Tomoteru Mizusaki, Tokyo (JP); Kiyotaka Nagamori, Tokyo (JP); Satoshi Aoki, Tokyo (JP); Hiroki Shiina, Tokyo (JP); Yasuhiro Seki, Tokyo (JP)

(73) Assignee: N.E. CHEMCAT CORPORATION, Tokyo (JP)

( * ) Notice: Subject to any disclaimer, the term of this patent is extended or adjusted under 35 U.S.C. 154(b) by 566 days.

(21) Appl. No.: 17/910,153

(22) PCT Filed: Mar. 16, 2021

(86) PCT No.: PCT/JP2021/010678
§ 371 (c)(1),
(2) Date: Sep. 8, 2022

(87) PCT Pub. No.: WO2021/193257
PCT Pub. Date: Sep. 30, 2021

(65) Prior Publication Data
US 2023/0126404 A1   Apr. 27, 2023

(30) Foreign Application Priority Data

Mar. 23, 2020 (JP) .................................. 2020-051421
Sep. 29, 2020 (JP) .................................. 2020-163682

(51) Int. Cl.
*H01M 4/92* (2006.01)
*H01M 4/86* (2006.01)
*H01M 8/1004* (2016.01)

(52) U.S. Cl.
CPC .......... *H01M 4/926* (2013.01); *H01M 4/8657* (2013.01); *H01M 4/923* (2013.01); *H01M 8/1004* (2013.01)

(58) Field of Classification Search
CPC .... H01M 4/926; H01M 4/8657; H01M 4/923; H01M 8/1004; H01M 4/96; H01M 4/92;
(Continued)

(56) References Cited

U.S. PATENT DOCUMENTS

2007/0031722 A1   2/2007  Adzic et al.
2014/0287344 A1   9/2014  Suzue et al.
(Continued)

FOREIGN PATENT DOCUMENTS

JP   2013-109856 A   6/2013
JP   2017-73356 A    4/2017
(Continued)

OTHER PUBLICATIONS

International Search Report dated Jun. 1, 2021, issued in counterpart International Application No. PCT/JP2021/010678 (2 pages).

*Primary Examiner* — Helen Oi K Conley
(74) *Attorney, Agent, or Firm* — WHDA, LLP

(57) ABSTRACT

The present invention provides an electrode catalyst which has excellent catalytic activity, and which can contribute to reducing the cost of a polymer electrolyte fuel cell (PEFC). According to the present invention, an electrode catalyst includes a hollow carrier including nanopores having a pore size of 1 to 20 nm, and a plurality of catalyst particles. The catalyst particles are supported both inside and outside the nanopores of the carrier, and comprise (zero-valent) Pt, and (Continued)

when a particle size distribution analysis of the catalyst particles is carried out using a three-dimensional reconstructed image obtained by electron beam tomography measurement employing STEM, the conditions of formula (S1): $100 \times (N10/N20) \leq 8.0$ are satisfied (in the formula, N10 is the number of noble metal particles not in contact with a pore having a pore size of 1 nm or more, and N20 is the number of catalyst particles supported inside the nanopores of the carrier).

15 Claims, 16 Drawing Sheets

(58) Field of Classification Search
CPC ........ H01M 8/1018; H01M 4/86; H01M 4/88; H01M 8/10; Y02E 60/50; B01J 23/42
See application file for complete search history.

(56) References Cited

U.S. PATENT DOCUMENTS

| | | |
|---|---|---|
| 2017/0104223 A1 | 4/2017 | Kaneko et al. |
| 2017/0338495 A1 | 11/2017 | Horiuchi et al. |
| 2019/0030514 A1 | 1/2019 | Uchida et al. |
| 2021/0184228 A1 | 6/2021 | Nagamori et al. |

FOREIGN PATENT DOCUMENTS

| | | |
|---|---|---|
| WO | 2016/063968 A1 | 4/2016 |
| WO | 2017/094648 A1 | 6/2017 |
| WO | 2019/221168 A1 | 11/2019 |

Example 1

Fig. 13 Example 1
Distribution state of Pt catalyst particle located inside and outside Nanopore of carbon carrier in the pore depth direction Example 1
Distribution state of Pt catalyst particle located inside Nanopore of carbon carrier in the pore depth direction Fig.18 Comparative Example 1
Distribution state of Pt catalyst particle located inside and outside Nanopore of carbon carrier in the pore depth direction Comparative Example 1
Distribution state of Pt catalyst particle located inside and outside Nanopore of carbon carrier in the pore depth direction

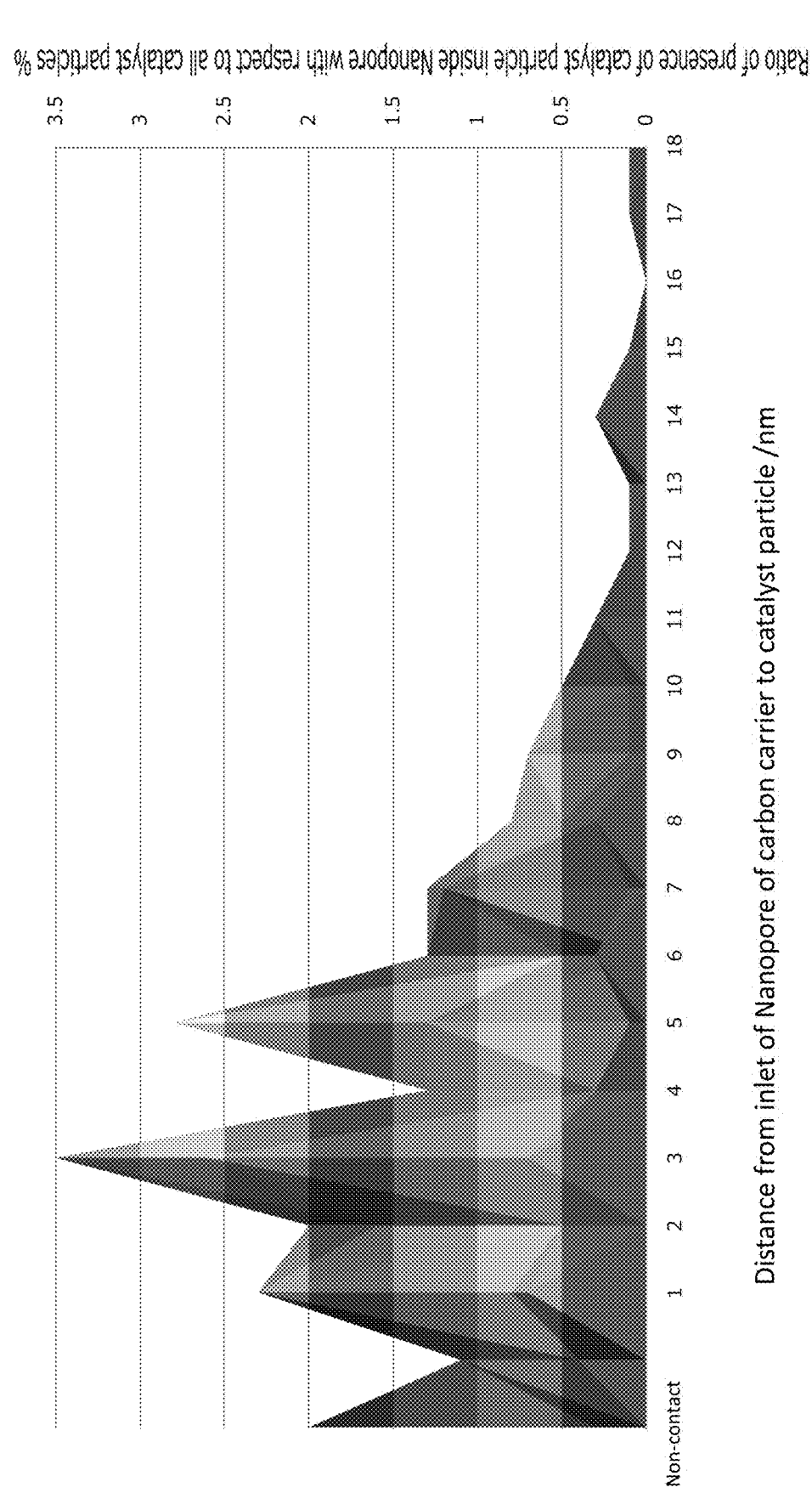
Fig.20 Comparative Example
Distribution state of Pt catalyst particle located inside and outside Nanopore of carbon carrier in the depth direction

ELECTRODE CATALYST, COMPOSITION FOR FORMING GAS DIFFUSION ELECTRODE, GAS DIFFUSION ELECTRODE, MEMBRANE ELECTRODE ASSEMBLY, AND FUEL CELL STACK

TECHNICAL FIELD

The present invention relates to a electrode catalyst having a hollow carbon as a carrier. More particularly, the present invention relates to a electrode catalyst suitably used for a gas diffusion electrode, and more particularly, to a electrode catalyst suitably used for a gas diffusion electrode of a fuel cell.

Further, the present invention relates to a composition for forming gas diffusion electrode, a membrane-electrode assembly, and a fuel cell stack comprising the above-described electrode catalyst particles.

BACKGROUND ART

Polymer electrolyte fuel cells (Polymer Electrolyte Fuel Cell: hereinafter referred to as "PEFC" as required) are being researched and developed as power sources for fuel cell vehicles and household cogeneration systems.

A noble metal catalyst composed of noble metal particles of a platinum group element such as platinum (Pt) is used for a catalyst used for a gas diffusion electrode of a PEFC.

For example, as a typical conventional catalyst, a "Pt supported carbon catalyst" (hereinafter, referred to as "Pt/C catalyst" as needed) is known which is a powder of catalyst particles in which Pt fine particles are supported on conductive carbon powder.

Among the production cost of PEFC, the ratio of the cost occupied by noble metal catalysts such as Pt is large, which has become a problem toward the cost reduction of PEFC and the popularization of PEFC.

Among these research and development, in order to reduce the amount of platinum used, conventionally, a powder of catalyst particles (hereinafter, referred to as "core-shell catalyst particles" if necessary) having a core-shell structure formed of a core portion made of a non-platinum element and a shell portion made of Pt (hereinafter, referred to as "core-shell catalyst particles") has been studied, and a large number of reports have been made.

For example, Patent Document 1 discloses a particle composite (corresponding to the core-shell catalyst particles) having a structure in which palladium (Pd) or a Pd alloy (corresponding to the core portion) is coated by an atomic thin layer of Pt atoms (corresponding to the shell portion). Further, in Patent Document 1, there is described as an example, a core-shell catalyst particle having a structure in which the core portion is Pd particles and the shell portion is a layer comprising Pt.

On the other hand, as a carrier of a electrode catalyst, there are hollow carbon having many pores inside the primary particle and solid carbon having fewer pores inside the primary particle compared with the hollow carbon, and studies have been made for improving performance utilizing the respective characteristics thereof.

For example, Patent Document 2 discloses an example of an investigation in which hollow carbon is adopted as a carrier. In addition, Patent Document 3 discloses an example of an investigation in which solid carbon is adopted as a carrier.

For example, in Patent Document 2, as shown in FIG. 10, as to a porous carrier (hollow carbon) 220 having an average particle size of 20 to 100 nm, there is disclosed a configuration of a electrode catalyst 200 in which a vacancy volume and a mode diameter of the vacancy distribution of a vacancy P220 having a vacancy diameter of 4 to 20 nm are controlled in predetermined ranges, and a catalyst particle 230 is supported in a primary vacancy P220 of the carrier 220.

In Patent Document 2, it is mentioned that, thereby, adsorption of the polymer electrolyte on the surface of the catalyst particles 230 existing in the primary vacancy P220 is prevented, and the gas transportability can be sufficiently secured while preventing the effective reaction surface area of the catalyst from being lowered. As a result, it has been mentioned that a catalyst layer for a fuel cell exhibiting excellent power generation performance can be provided in which the activity per catalyst weight is improved even when the amount of catalyst is reduced.

Further, for example, Patent Document 3 discloses an electrode catalyst (Pt/Co/C catalyst) for a fuel cell having a solid carbon carrier and a catalyst particle containing an alloy of platinum and cobalt supported on the carrier. The electrode catalyst has a molar ratio of platinum to cobalt of 4 to 11:1 in the alloy and is acid treated at 70 to 90° C.

In Patent Document 3, when a Pt/Co alloy is supported on a hollow carbon carrier, a part of Pt/Co alloy is encompassed inside the hollow carbon carrier, and even if an acid treatment for suppressing elution of Co is performed, it is difficult to sufficiently treat Pt/Co alloy present inside the carrier, and as a result, Co is easily eluted from Pt/Co alloy present inside the carrier, and it has been viewed as a problem.

Therefore, in Patent Document 3, it is mentioned that, by using a solid carbon carrier instead of a hollow carbon carrier, it is possible to avoid inclusion of a Pt/Co alloy inside the carrier. In addition, thus, it is disclosed that it becomes possible to sufficiently acid-treat the Pt/Co alloy and to suppress the elution of Co. It is mentioned that it is possible to balance both the initial performance and durability performance of the fuel cell, as a result.

Here, in Patent Document 3, the solid carbon is defined as follows. Namely, it is referred in Patent Document 3 that the solid carbon is a carbon having fewer voids inside carbon as compared with a hollow carbon, and specifically, a carbon in which a ratio (t-Pot surface area/BET surface area) of BET surface area determined by N2 adsorption to outer surface area by t-Pot (surface area outside particle was calculated from particle size) is 40% or more.

Note that the "t-Pot surface area" described in Patent Document 3 is understood to indicate, for example, "t-plot (t-plot) surface area" described in the technical report "Analysis of Micropore Surface Area by t-plot Method" published on the internet by "MCEvatec Co., Ltd" on Feb. 1, 2019. The analysis of the micropore surface area by t-plot method is one of the methods to analyze from the adsorption isotherm (adsorption temperature: 77K) of nitrogen. This method is a method to compare and convert the data of adsorption isotherm with the standard isotherm, and to graph the relationship between thickness t of adsorption layer and adsorption amount. In addition to the fact that the specific surface area can be separated into the inside and the outside of the pores and quantified, the tendency of the pores can be known from the shape of the graph.

Examples of the solid carbon include, for example, the carbon described in Japanese Patent No. 4362116, and specifically, it is disclosed that a denka black (registered trademark) manufactured by Electrochemical Industry Co., Ltd. may be exemplified.

Furthermore, Patent Document 4 discloses an electrode catalyst (core-shell catalyst) where the catalyst particles are supported both inside and outside the mesopores of the hollow carbon carrier {more specifically, the Nanopores formed in the primary particles of the hollow carbon carrier}. This electrode catalyst has a structure that a ratio of the catalyst particles supported inside the mesopore {more specifically, the Nanopores formed in the primary particles of the hollow carbon carrier} is 50% or more when an analysis of a particle size distribution of the catalyst particles is performed by using a three-dimensional reconstructed image obtained by an electron beam tomography measurement using an STEM (scanning transmission electron microscopy).

Here, in the present specification, the "Nanopore" of the hollow carbon carrier is referred to as an academic paper: "M. Uchida, et al., Phys. Chem. Chem. Phys., 2013, 15 (27), 11236-1124 (see, e.g., FIG. 1)" indicates "Nanopore" formed in the "primary particle" of the hollow carbon carriers.

In Non-Patent Document 1 and Non-Patent Document 2 mentioned below, with respect to the catalyst particles supported on the hollow carbon carrier, there is disclosed that the ratio of the catalyst particles supported inside the pores {Nanopore described above} and the ratio of the catalyst particles supported on the outside of the (Nanopore described above) are analyzed by a method different from that of Patent Document 4 described above.

More specifically, in Non-Patent Document 1, Strasser et al. of a group of Berlin Institute of Technology, with respect to the Pt/C catalyst in which Pt catalyst particles are highly dispersed on the commercially available hollow carbon (trade name: "ketjenblack EC-300J", manufactured by Akzo Nobel, specific surface area: about 839 $m^2$ $g^{-1}$), report the results of simultaneous imaging of SEM (Scanning Electron Microscopy) images and TSEM (Transmission SEM) images of the specific Pt/C catalyst particles of interest in the same measurement area. is doing. For example, see Table 1, FIG. 2 and the right column of P.79 of Non-Patent Document 1.

In their method, the SEM image provides information on the Pt catalyst particles present only on the observed portion (one outer surface) of the outer surface of the hollow carbon carrier particles. That is, information on the number of particles of the catalyst particles supported on the outside of the Nanopores of the hollow carbon carrier particles can be obtained. On the other hand, from the TSEM image (transmission image), information on all the catalyst particles supported on the outside and the inside of the hollow carbon carrier particles (the above-mentioned primary particles) in the observed Pt catalyst particles can be obtained. Then, from the information from the TSEM image and the information from the SEM image, among the Pt catalyst particles supported on the hollow carbon carrier particles, they tried the attempt to distinguish the Pt catalyst particles supported on the outer surface (outside the Nanopores) from the Pt catalyst particles supported on the inside.

Here, in Non-Patent Document 1, as to the SEM images, they do not carry out the measurement of "the back surface on the opposite side" with respect to the observed portion ("outer surface on one side") of the outer surface (outside of the Nanopores) of the hollow carbon carrier particles. They assume that the state of the "outer surface on one side" and the state of the "back surface on the other side" are the same. That is, it is assumed that the number of particles of the catalyst particles supported on the "outer surface on one side" and the number of particles of the catalyst particles supported on the "back surface on the opposite side" are the same.

Next, in Non-Patent Document 2, Mr. Uchida et al. of a group at Yamanashi University report the results of photographing a Pt/C catalyst in which Pt catalyst particles are highly dispersed on the commercially available hollow carbon (Product name: "Ketjenblack", manufactured by Ketjen Black International, specific surface area: approx. 875 $m^2$ $g^{-1}$), by using STEM (Scanning Transmission Electron Microscope) device capable of photographing SEM images and TEM (transmission electron microscopy) images of Pt catalyst particles. For example, see FIG. 1, Table 2 and the lower right column of P.181 of Non-Patent Document 2.

First, they obtain information on the number of particles of all Pt catalyst particles supported on the hollow carbon carrier particles from the TEM image of the catalyst particles of the specific Pt/C catalyst of interest. Next, they obtain information on the number of Pt catalyst particles present only on the back surface of the hollow carbon carrier particles from the measurement of the SEM image of the same Pt/C catalyst particles as those taken by the TEM image. Next, they use a special 3D sample holder to rotate the specific Pt/C catalyst particle (measuring sample) of interest by exactly 180° C., to measure the SEM image of only the back surface of the same Pt/C catalyst particle. Using the information, among the Pt catalyst particles supported on the hollow carrier particles, they tried the attempt to distinguish the Pt catalyst particles supported on the outer surface from the Pt catalyst particles supported on the inside.

They report that the "internal supporting ratio"="100× (number of Pt catalyst particles supported inside)/(total number of Pt catalyst particles)" measured by this method of the commercially available 30 wt % Pt/C catalyst (trade name: "TEC10E30E", manufactured by Tanaka Metal Industry Co., Ltd., expressed as "c-Pt/CB," in the specification) is 62%, the internal supporting ratio of the commercially available 46 wt % Pt/C catalyst (trade name: "TEC10E50E", Tanaka Metal Industry Co., Ltd, expressed as "Pt/CB" in the specification) is 50% or more.

As described above, the present inventors recognize that the analysis methods of Non-Patent Document 1 and Non-Patent Document 2 are different from the analysis method of Patent Document 4 in the following points.

That is, the analysis method by electron tomography measurement in Patent Document 4 is a three-dimensional reconstruction method using an electron microscope, in which the same field of view of the sample to be measured of interest (the size of the target sample to be measured is a mass of about 100 to 300 nm in major axis or minor axis: see FIG. 11 and FIG. 15 described later) is projected from various directions to obtain the electron microscope images, and the images are reconstructed into a three-dimensional image in a computer, and then, a tomogram is prepared using the computer.

On the other hand, the analysis method of Non-Patent Document 1 performs analysis by using two-dimensional images such as an SEM image and a TSEM image obtained by taking a sample to be measured from a specific one direction. Further, in the analysis method of Non-Patent Document 2, the analysis is performed by using a two-dimensional image such as the SEM image of the sample to be measured taken from two specific directions (the directions of two axes orthogonal to each other obtained by rotating the sample holder by 180° C.) and the TSEM image of the sample to be measured taken from the specific one direction. In these analysis methods of Non-Patent Document 1 and Non-Patent Document 2, the present inventors consider that, for example, when the sample to be measured (catalyst particles for electrodes) has concave and convex portions, among such the catalyst particles, there is a high possibility that there is something that cannot be sufficiently determined whether the supporting position is inside or outside of the hollow carbon carrier.

In the analysis method of Patent Document 4 where a three-dimensional tomographic image (tomogram) of the sample to be measured is used and this can be observed from various reports, the present inventors consider that, with respect to the sample to be measured of interest (the size of the target sample to be measured is a mass of about 100 to 300 nm in major axis or minor axis; see FIG. 11 and FIG. 15 described later), the supporting position of the catalyst particles contained in the electrode catalyst is possible to more accurately grasp by virtual confirmation.

The applicant of the present patent application presents the following publications as a publication in which the known inventions described in the above publications are described.

PRIOR ART DOCUMENT

Patent Document

Patent Document 1: US Un-examined Patent Application Publication No. 2007/31722
Patent Document 2: Japanese Un-examined Patent Application Publication No. 2013-109856
Patent Document 3: WO20161063968
Patent Document 4: WO2019/221168

Non-Patent Document

Non-patent Document 1: Nature Materials Vol 19 (January 2020)77-85
Non-patent Document 2: Journal of Power Sources 315 (2016)179-191

SUMMARY OF THE INVENTION

Problem to be Solved by the Invention

Toward the spread of PEFC, in order to reduce the amount of Pt used and the material cost, further improvement in catalytic activity is required for the electrode catalyst.

The present inventors have found that, as to the Pt/C catalyst, there is no report that, when an analysis of a particle size distribution of the catalyst particles is performed by using a three-dimensional reconstructed image obtained by an electron beam tomography measurement using an STEM (scanning transmission electron microscopy), an improved product having a structure in which the catalyst particles are supported more inside than the outside of the Nanopore of the primary particles of the hollow carbon carrier could be actually synthesized, and there is still room for improvement.

The present invention was achieved in view of such technical circumstances, and it is an object of the present invention to provide a electrode catalyst (Pt/C catalyst) having excellent catalytic activity capable of contributing to cost reduction of PEFC.

Further, it is an object of the present invention to provide a composition for forming gas diffusion electrode, a gas diffusion electrode, a membrane-electrode assembly (MEA), and a fuel cell stack, which include the above-described electrode catalyst.

Means to Solve the Problems

The present inventors have intensively studied a configuration of a electrode catalyst in which a large number of catalyst particles of a Pt/C catalyst are supported in a Nanopore of a hollow carbon to realize further improvement in catalytic activity.

As a result, it has been found that the catalyst particles are supported on a carrier so as to satisfy the following conditions, which is effective for improving the catalytic activity, and thus the present invention was completed.

More specifically, the present invention is composed of the following technical matters.

That is, the present invention provides an electrode catalyst which includes a conductive hollow carbon carrier having a Nanopore of a pore size of 1 to 20 nm, and a plurality of catalyst particles supported on the carrier, wherein the catalyst particle is composed of Pt (0 valent),
the catalyst particle is supported on both of inside of the Nanopore and outside the Nanopore of the carrier, and when an analysis of a particle size distribution of the catalyst particles is performed by using a three-dimensional reconstructed image obtained by an electron beam tomography measurement using an STEM (scanning transmission electron microscopy), the condition of the following equation (S1) is satisfied:

$$100 \times (N10/N20) \leq 8.0 \quad (S1)$$

Here, in the above equation (S1), N10 is the number of non-contact particles (n101+n102), which is the sum of ( ) the number of particles (n101) of noble metal particles that are not in contact with pores having a pore diameter of 1 nm or more that can be confirmed by the electron tomography measurement and (II) the number of noble metal particles (n102) that are not in contact with the hollow carbon carrier itself and exist outside the hollow carbon carrier.

N20 is the number of particles of the catalyst particles supported inside the Nanopores of the carrier.

Further, here, with respect to the non-contact particles and the number of particles N10 (=n101+n102) of the non-contact particles and the non-contact particles, when the presence of the noble metal particles of (II) is not confirmed by the electron tomography measurement, that is, the number of particles of the noble metal of (II) n102=0 (or when n102≈0 can be regarded), the present inventors consider that the non-contact particles can be understood as follows.

That is, in this case, the "non-contact particles" are "noble metal particles (catalyst particles) that are not in contact with pores having a pore diameter of 1 nm or more that can be confirmed by the electron tomography measurement", in other words, in this case, the "non-contact particles" are referred to as "catalyst particles in contact with pores having a pore diameter of less than 1 nm that cannot be confirmed by the electron tomography measurement". In fact, the presence of the noble metal particles (I) has not been confirmed in the electrode catalyst of the present invention prepared by the present inventors.

In the present specification, in order to distinguish from Nanopores, "pores having a pore diameter of less than 1 nm" are referred to as "micropores", and pores having a pore diameter of more than 20 nm are referred to as macropores.

The present inventors consider that there is extremely high possibility that the non-contact particles (micropores) having a pore diameter of less than 1 nm that cannot be confirmed by the electron tomography measurement) in this case are embedded in the micropores and cannot effectively contribute to the progress of the electrode reaction.

As shown in FIG. 2 and FIG. 10, when micropores are present in the hollow carbon carrier to be used, the non-contact particles (catalyst particles) embedded in the micropores are considered so that they are present in both of are the conventional electrode catalyst 200 and the electrode catalyst 20 of the present invention (see the non-contact particles 25 in FIG. 2 and the non-contact particles 250 in FIG. 10).

In the present invention, by supporting the catalyst particles of the Pt/C catalyst on the hollow carbon carrier so as to satisfy the condition of the above equation (S1), the electrode catalyst of the present invention exhibits excellent catalytic activity to contribute to the cost reduction of PEFC.

The detailed reason why the electrode catalyst of the present invention has excellent catalytic activity has not been fully elucidated.

However, the present inventors think as follows. That is, the Pt/C catalyst in which the catalyst particles supported on the inside of the Nanopores satisfy the condition of the equation (S1) has few the non-contact particles (catalyst particles) embedded in the micropores of the carrier as compared with the conventional electrode catalysts, and thus there are a relatively large number of highly active catalyst particles are present inside the Nanopores of the carrier.

The catalyst particles supported inside the Nanopores of such a carrier are supported on the carrier in a state in which these catalyst particles are hardly in direct contact with the polymer electrolyte present in the catalyst layer. Therefore, the electrode catalyst of the present invention reduces the decrease in catalytic activity due to poisoning of the Pt component and can exhibit an excellent catalytic activity when made into an electrode as compared with a conventional electrode catalyst. In addition, the electrode catalyst of the present invention also reduces the dissolution of the Pt component from the catalyst particles.

Here, in the present invention, the "Nanopore" of the primary particles of the hollow carbon carrier indicates the "Nanopore" formed in the "primary particle" of the hollow carbon carrier which is referred to as an academic paper: "M. Uchida, et al., Phys. Chem. Chem. Phys., 2013, 15 (27), 11236-1124 (see, e.g., FIG. 1)".

Then, in the present invention, the "pore diameter of Nanopore" indicates the "size of the inlet of Nanopore".

Furthermore, in the present invention, the "pore diameter (size of the inlet of the pore)" of Nanopore indicates the size of the "Nanopore inlet" determined by the "USAL-KM3D analysis method" described later. More specifically, the "size of the inlet of Nanopore" indicates the diameter of a circle (circle equivalent diameter) having the same area as the area of the inlet obtained from the image of the inlet of the Nanopore obtained by the "USAL-KM3D analysis method".

Further, here, in the present invention, the "hollow carbon" is a carbon having more pores (voids) inside the carbon than the solid carbon described above, and is a conductive carbon containing the above-mentioned Nanopores in a part of the pores.

Furthermore, from the viewpoint of more reliably obtaining the effect of the present invention, it is preferable that the hollow carbon carrier contains more Nanopores having a pore diameter (size of the inlet of the pore) of 1 to 10 nm among the Nanopores. It has been reported that the micellar diameter of the polyelectrolyte used for the anode and cathode catalyst layers of MEA is about 10 nm (for example, Y. S. Kim, et al. DOE Hydrogen Program Merit Review and Peer Meeting FC16, (2009)). Therefore, by using the hollow carbon carrier containing more pores having a pore diameter (size of the inlet of the pore) of 1 to 10 nm, it becomes difficult for the polyelectrolyte to penetrate into the Nanopores, and it is more reliably prevented the contact between the catalyst particles supported inside the Nanopores and the polyelectrolyte.

Further, here, in the present invention, the "analysis method of a particle size distribution of the catalyst particles is performed by using a three-dimensional reconstructed image obtained by an electron beam tomography measurement using an STEM (scanning transmission electron microscopy)" is an analysis method (analysis method name: "USAL-KM3D analysis method") using STEM (scanning transmission electron microscope) at UBE Scientific Analysis Center Co., Ltd., in which electron tomography measurement is performed, and the obtained measurement data is subjected to image analysis using an image analysis software ("Avizo" available from FEI).

In the USAL-KM3D analysis method, a sample to be measured is prepared according to the following procedure and conditions.

<Preparation Method and Conditions of Sample to be Measured>

First, in order to optimally measure the structure of the sample to be measured, the sample to be measure is prepared on the "Cu grid mesh with carbon support film" for TEM observation by the dispersion method, which is a general electron microscope sample preparation method to satisfy the following conditions.

(P1) On the grid mesh, there is a mass of powder (electrode catalyst) to be measured (a mass having a major axis or a minor axis in the range of about 100 to 300 nm, see FIG. 11 and FIG. 15 described later) so as to be measurable (observable) at an appropriate frequency {the number of particles (the number of observable catalyst particles is 100 or more, preferably 200 or more, more preferably 300 or more, still more preferably 400 or more)}.

(P2) When the grid mesh is rotated at a rotation angle of ±80° on its rotation axis, the captured image of the powder mass of the sample to be measured does not overlap with the captured image of the other fine powder mass. If the captured image of the powder mass of the sample to be measured overlaps with the captured image of the other fine powder mass, three-dimensional analysis cannot be performed.

(P3) A plurality of powder masses visible in the measurement area are arranged so as to be apart from each other to the extent that 3D tomography observation is possible for the powder masses of the sample to be measured.

<Measurement Conditions>

Nanopores of 1 nm or more among the pores contained in the powder mass of the above-mentioned target sample to be measured (electrode catalyst) are subjected to the 3D tomography observation under the three-dimensionally visually distinguishable conditions (for example, adjustment of the acceleration voltage of the electron beam) without damaging the powder mass of the measurement target sample (electrode catalyst).

Then, for the powder mass of the sample to be measured (electrode catalyst), the measurement data obtained when measuring the "distance (shortest distance) from the inlet of the Nanopore to the supporting position of the catalyst particles" described later is obtained by image-analyzing with an image analysis software ("Avizo" available from FEI).

Further, in the electrode catalyst of the present invention, it is preferable that from the viewpoint of obtaining the effect of the present invention more reliably, when an analysis of a particle size distribution of the catalyst particles is performed by using a three-dimensional reconstructed image obtained by an electron beam tomography measurement using an STEM (scanning transmission electron microscopy), the condition of the following equation (S2) is satisfied.

$$100 \times \{N10/(N20+N30)\} \leq 6.0 \tag{S2}$$

In the equation (S2), N10 is synonymous with N10 in the formula (S1),

Further, in the equation (S2), N20 is synonymous with N20 in the formula (S1),

Furthermore, in the equation (S2), N30 is the number of particles of the catalyst particles supported on the outside of the Nanopores of the carrier.

By supporting the catalyst particles on the hollow carbon carrier so as to simultaneously satisfy the conditions of the above equation (S2), the electrode catalyst of the present invention has few the non-contact particles (catalyst particles) embedded in the micropores of the carrier as compared with the conventional electrode catalysts, and thus there are a relatively large number of highly active catalyst particles are present inside the Nanopores of the carrier. And then, the electrode catalyst of the present invention exhibits more reliably excellent catalytic activity to contribute to the cost reduction of PEFC.

Further, when an analysis of a particle size distribution of the catalyst particles is performed by using a three-dimensional reconstructed image obtained by an electron beam tomography measurement using an STEM (scanning transmission electron microscopy), it is preferable that with respect to the catalyst particles supported inside the Nanopore of the carrier, an average distance from the inlet of the Nanopores to the supported position of the catalyst particles is of 6.0 nm or more. The present inventors consider that the catalyst particles satisfying this condition are supported inside the Nanopores of the carrier and can sufficiently prevent the contact with the polyelectrolyte. Further, the present inventers consider that the catalyst particles satisfying this condition are supported inside the Nanopores of the carrier, but exist at an appropriate depth from the inlet of the Nanopores, so that the supply of protons, oxygen gas, and hydrogen gas can be relatively obtained.

Here, the "distance from the inlet of the Nanopores to the supporting position of the catalyst particles" is "when using a three-dimensional image showing the internal three-dimensional structure of the carrier including the Nanopores obtained by electron tomography measurement, the length of the shortest line drawn from the inlet of the Nanopore to the catalyst particle of interest along the uneven inner wall of the Nanopore (there are irregularities and curved surface) (the shortest way to connect along the inner wall of the Nanopore from the inlet of the Nanopore to the catalyst particles)". Furthermore, when there are multiple inlets of the Nanopores for the catalyst particles of interest inside the Nanopores, the distance (shortest path) from the inlet of each Nanopore to the supporting position of the catalyst particles is determined, the shortest distance among them is selected. The "average distance from the inlet of the Nanopores to the supporting position of the catalyst particles" is an additive average of all "distances from the inlet of the Nanopores to the supporting position of the catalyst particles" in the powder mass of the sample to be measured (electrode catalyst) of interest.

Furthermore, in the electrode catalyst of the present invention, from the viewpoint of further reliably obtaining the effect of the present invention, when an analysis of a particle size distribution of the catalyst particles is performed by using a three-dimensional reconstructed image obtained by an electron beam tomography measurement using an STEM (scanning transmission electron microscopy), it is preferable that the catalyst particles supported inside the Nanopore of the carrier exist within a range that a distance from the inlet of the Nanopore to the supported position of the catalyst particles of 0 to 24 nm.

The present inventors consider that the catalyst particles satisfying this condition are supported inside the Nanopores of the carrier, but exist at an appropriate depth from the inlet of the Nanopores, and the effect of obtaining a sufficient supply of reaction gases and protons can be obtained more reliably, while avoiding contact with the above-mentioned polymer electrolyte.

Further, in the electrode catalysts of the present invention, from the viewpoint of further reliably obtaining the effect of the present invention, when an analysis of a particle size distribution of the catalyst particles is performed by using a three-dimensional reconstructed image obtained by an electron beam tomography measurement using an STEM (scanning transmission electron microscopy), it is preferable that a particle size of the catalyst particles supported inside the Nanopore of the carrier is more than 0 nm and 4 nm or less.

The present inventors consider that, since the catalyst particles satisfying this condition have an appropriate particle size to give a sufficient reaction surface area, the electrode reaction can be sufficiently promoted even if the particles are supported inside the Nanopore of the carrier.

Further, in the electrode catalysts of the present invention, from the viewpoint of further reliably obtaining the effect of the present invention, when an analysis of a particle size distribution of the catalyst particles is performed by using a three-dimensional reconstructed image obtained by an electron beam tomography measurement using an STEM (scanning transmission electron microscopy), it is preferable that a ratio of the catalyst particles supported inside the Nanopore is 50% or more, more preferably 70% or more.

By supporting the catalyst particles of the Pt/C catalyst on the hollow carbon carrier so as to satisfy the above conditions, a large number of the highly active catalyst particles having a relatively small particle size exist inside the Nanopores of the carrier as compared with the conventional electrode catalysts.

The catalyst particles supported inside the Nanopores of such a carrier are supported on the carrier in a state in which these catalyst particles are hardly in direct contact with the polymer electrolyte present in the catalyst layer. Therefore, the electrode catalyst of the present invention reduces the decrease in catalytic activity due to poisoning of the Pt component and can exhibit an excellent catalytic activity when made into an electrode as compared with a conventional electrode catalyst. In addition, the electrode catalyst of the present invention also reduces the dissolution of the Pt component from the catalyst particles.

Further, in the electrode catalyst of the present invention, at least a part of the surface of the catalyst particles may be covered with a Pt oxide film as long as the catalyst particles can exhibit excellent catalytic activity.

Further, from the viewpoint of obtaining the effect of the present invention more reliably, in the catalyst for the electrode of the present invention, the BET specific surface area (nitrogen adsorption specific surface area) of the hollow carbon carrier is preferably 200 to 1500 m$^2$/g.

When the catalyst for the electrode is used for the cathode, the BET specific surface area (nitrogen adsorption specific surface area) of the hollow carbon carrier is preferably 700 to 1500 m$^2$/g from the viewpoint of more reliably obtaining the effect of the present invention, more preferably 750 to 1400 m$^2$/g. Furthermore, when the catalyst for the electrode is used for the cathode from the viewpoint that it is preferable to have a predetermined durability in consideration of the operating environment (temperature fluctuation range, potential fluctuation range) of the cathode, the BET specific surface area (nitrogen adsorption specific surface area) of the hollow carbon carrier is preferably 750 to 900 m$^2$/g.

Furthermore, in the electrode catalyst of the present invention, the hollow carbon carrier is preferably Ketjen Black EC300J (Ketjen EC300J) from the viewpoint of availability of the carrier and raw material cost. In this case, the BET specific surface area (nitrogen adsorption specific surface area) of the hollow carbon carrier (Ketchen Black EC300J) is preferably 750 to 850 m$^2$/g, and more preferably 800 to 850 m$^2$/g from the viewpoint of obtaining better initial performance of the electrode.

Further, the present invention provides a powder of the electrode catalyst containing 10 wt % or more of the above-mentioned electrode catalyst of the present invention.

In the powder of the electrode catalyst, the "containing component other than the above-mentioned electrode catalyst of the present invention" is "the electrode catalyst other than the above-mentioned electrode catalyst of the present invention". That is, the powder of the electrode catalyst of the present invention does not include the powder which does not function as the electrode catalyst.

Since the powder of the electrode catalyst of the present invention contains the above-mentioned electrode catalyst of the present invention, it is possible to exhibit excellent catalytic activity that can contribute to cost reduction of PEFC.

Here, from the viewpoint of more reliably obtaining the effect of the present invention, the content of the above-mentioned electrode catalyst of the present invention in the powder of the electrode catalyst of the present invention is preferably 30 wt % or more, more preferably 50 wt % or more, further preferably 70 wt % or more, and most preferably 90 wt % or more.

The powder of the electrode catalyst of the present invention may contain a electrode catalyst having the following configuration (for convenience, referred to as "electrode catalyst P") in addition to the above-mentioned electrode catalyst of the present invention.

That is, the catalyst for an electrode P has a structure where the catalyst contains a hollow carbon carrier having Nanopores of a pore diameter of 1 to 20 nm, and a plurality of catalyst particles supported on the carrier, the catalyst particles are Pt (0 valent),
the catalyst particles are supported both inside the Nanopores of the carrier and outside the Nanopores, and
when the analysis of the particle size distribution of the catalyst particles by using the above-mentioned "USAL-KM3D analysis method" is carried out, the ratio of the catalyst particles supported on the inside of the Nanopores is "less than 50%".

The powder of the electrode catalyst of the present invention may be composed of the above-mentioned electrode catalyst of the present invention and the electrode catalyst P.

Also in this case, from the viewpoint of more reliably obtaining the effect of the present invention, the content of the above-mentioned electrode catalyst of the present invention in the powder of the electrode catalyst of the present invention is preferably 30 wt % or more, more preferably 50 wt %, further preferably 70 wt % or more, most preferably 90 wt % or more.

Further, the present invention provides a gas diffusion electrode containing the above-described electrode catalyst of the present invention or the powder of the electrode catalyst of the present invention.

Since the gas diffusion electrode of the present invention includes the electrode catalyst of the present invention or the powder of the electrode catalyst of the present invention, it becomes easy to have a configuration having excellent catalytic activity (polarization property) which can contribute to cost reduction of PEFC.

Further, the present invention provides a gas diffusion electrode containing the above-described electrode catalyst of the present invention or the powder of the electrode catalyst of the present invention.

The gas diffusion electrode of the present invention includes the electrode catalyst of the present invention. Therefore, it becomes easy to have a configuration having excellent catalytic activity (polarization property) which can contribute to cost reduction of PEFC.

Furthermore, the present invention provides a membrane-electrode assembly (MEA) including the above-mentioned gas diffusion electrode of the present invention.

Since the membrane-electrode assembly (MEA) of the present invention includes the gas diffusion electrode of the present invention, it becomes easy to have a configuration having a cell property capable of contributing to cost reduction of PEFC.

Further, the present invention provides a fuel cell stack, in which the membrane-electrode assembly (MEA) of the present invention described above is included.

According to the fuel cell stack of the present invention, since the membrane-electrode assembly (MEA) of the present invention is included, it is easy to have a configuration having a cell property capable of contributing to cost reduction of PEFC.

Effects of the Invention

According to the present invention, there is provided a electrode catalyst having excellent catalytic activity capable of contributing to cost reduction of PEFC.

Further, according to the present invention, there is provided a composition for forming gas diffusion electrode, a gas diffusion electrode, a membrane-electrode assembly (MEA), and a fuel cell stack, each of which includes such a electrode catalyst.

BRIEF DESCRIPTION OF THE DRAWINGS

FIG. 20 is a graph showing the distribution state of Pt catalyst particle located inside Nanopore of carbon carrier in the pore depth direction catalyst particles obtained by image analysis of the 3D-STEM image of the catalyst of Comparative Example 1 shown in FIG. 17.

MODE FOR CARRYING OUT THE INVENTION

Hereinafter, with reference to figures as appropriate, a suitable embodiment of the present invention is explained in detail.

<Membrane-Electrode Assembly (MEA)>

Figure 1:
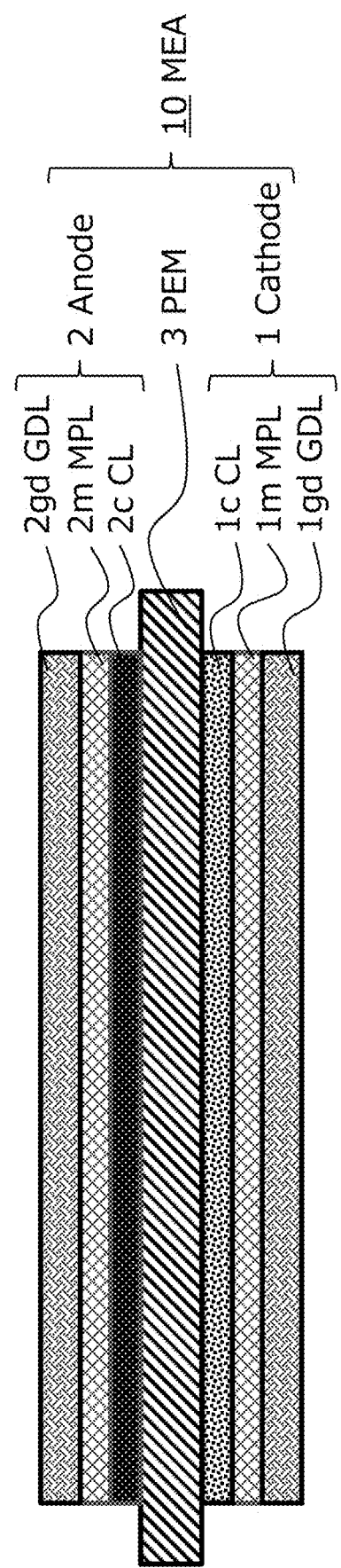
FIG. 1 is a schematic cross-sectional view showing a preferred embodiment of the MEA of the present invention.

FIG. 1 is a schematic cross-sectional view showing a preferred embodiment of the MEA of the present invention.

The MEA10 shown in FIG. 1 has the configuration provided with two gas diffusion electrodes (the cathode 1 and the anode 2) having the shape of a plate arranged in the state opposing each other, and the polymer electrolyte membrane (Polymer Electrolyte Membrane, hereinafter referred to as "PEM" if needed) 3 arranged between the cathode 1 and the anode 2.

In this MEA10, at least one of the cathode 1 and the anode 2 has a configuration in which a electrode catalyst 20 (Pt catalyst 20) to be described later is contained.

The MEA10 can be produced by laminating the cathode 1, the anode 2, and the PEM 3 as shown in FIG. 1 and then applying a pressure to adhere.

<Gas Diffusion Electrode (GDE)>

The cathode 1 as a gas diffusion electrode has a configuration including a gas diffusion layer 1gd and a catalyst layer 1c, which is formed on the PEM 3 side surface of the gas diffusion layer 1gd. Further, the cathode 1 has a water repellent layer (Micro Porous Layer, hereinafter, referred to as "NMPL" as needed) 1m arranged between the gas diffusion layer 1gd and the catalyst layer 1c.

Similarly to the cathode 1, the anode 2, which is a gas diffusion electrode, has a configuration including a gas diffusion layer 2gd and a catalyst layer 2c, which is formed on the PEM 3 side surface of the gas diffusion layer 2gd, and a MPL 2m, which is arranged between the gas diffusion layer 2gd and the catalyst layer 2c.

(Catalyst Layer (CL))

In the cathode 1, the catalyst layer 1c is a layer in which a reaction proceeds such that water is generated from air (oxygen gas) sent from the gas diffusion layer 1gd and hydrogen ions moving through the PEM 3 from the anode 2.

In addition, in the anode 2, the catalyst layer 2c is a layer in which a reaction in which hydrogen ions and electrons are generated from hydrogen gas sent from the gas diffusion layer 2gd proceeds.

At least one of the catalyst layer 1c of the cathode 1 and the catalyst layer 2c of the anode 2 includes the electrode catalyst 20 of the present invention.

Preferred Embodiment of the Electrode Catalyst of the Present Invention

Hereinafter, the preferred embodiment of the electrode catalyst of the present invention will be described with reference to FIG. 2.

Figure 2:
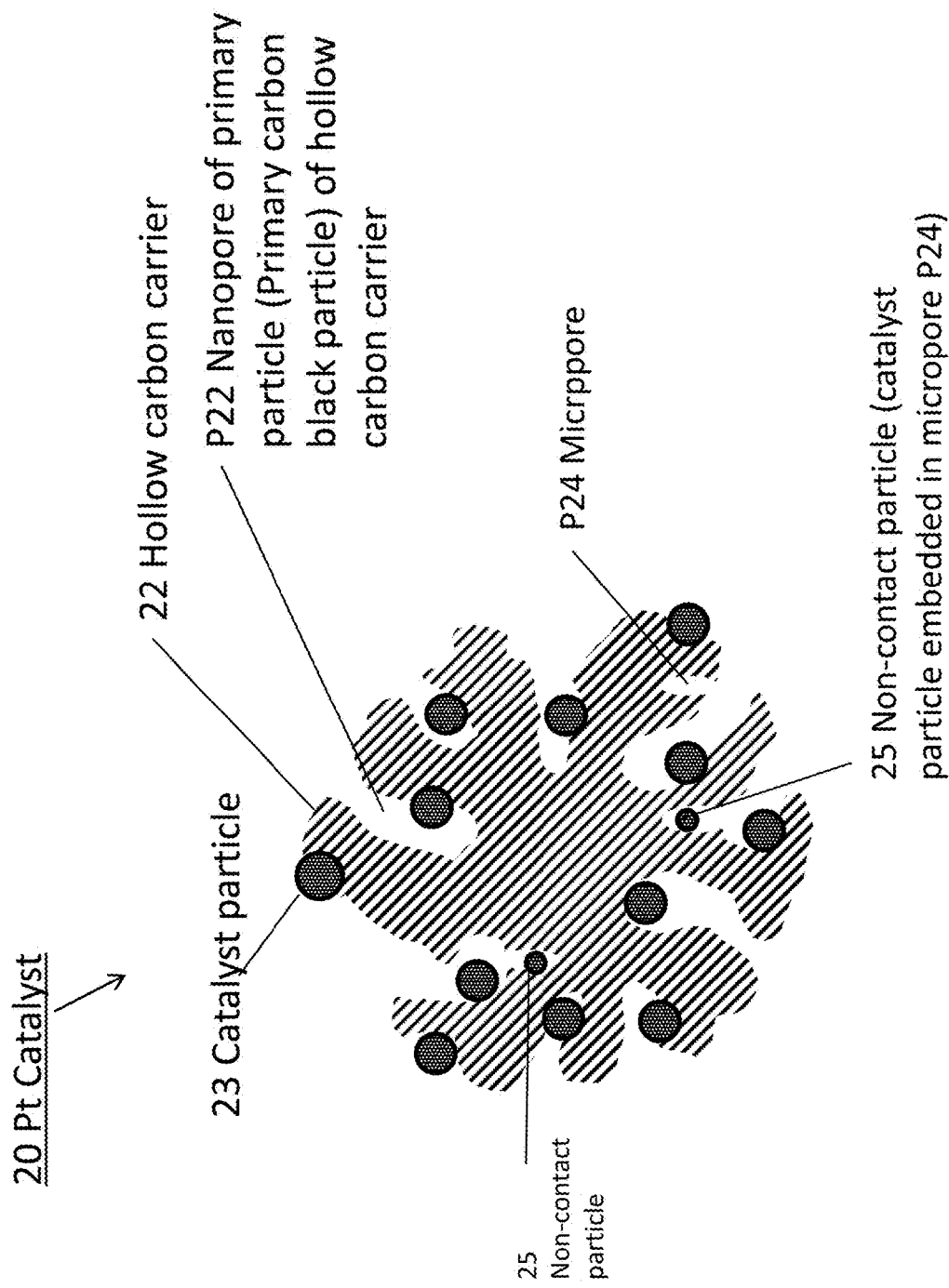
FIG. 2 is a schematic cross-sectional view showing a preferred embodiment of the catalyst for electrode of the present invention included in at least one of the cathode catalyst layer and the anode catalyst layer of the MEA shown in FIG. 1.

FIG. 2 is a schematic cross-sectional view showing a preferred embodiment of the electrode catalyst (Pt/C catalyst) included in at least one of the cathode catalyst layer 1c and the anode catalyst layer 2c of the MEA10 shown in FIG. 1. Further, FIG. 3 is an enlarged schematic cross-sectional view showing a schematic configuration of the electrode catalyst 20 shown in FIG. 2.

Figure 3:
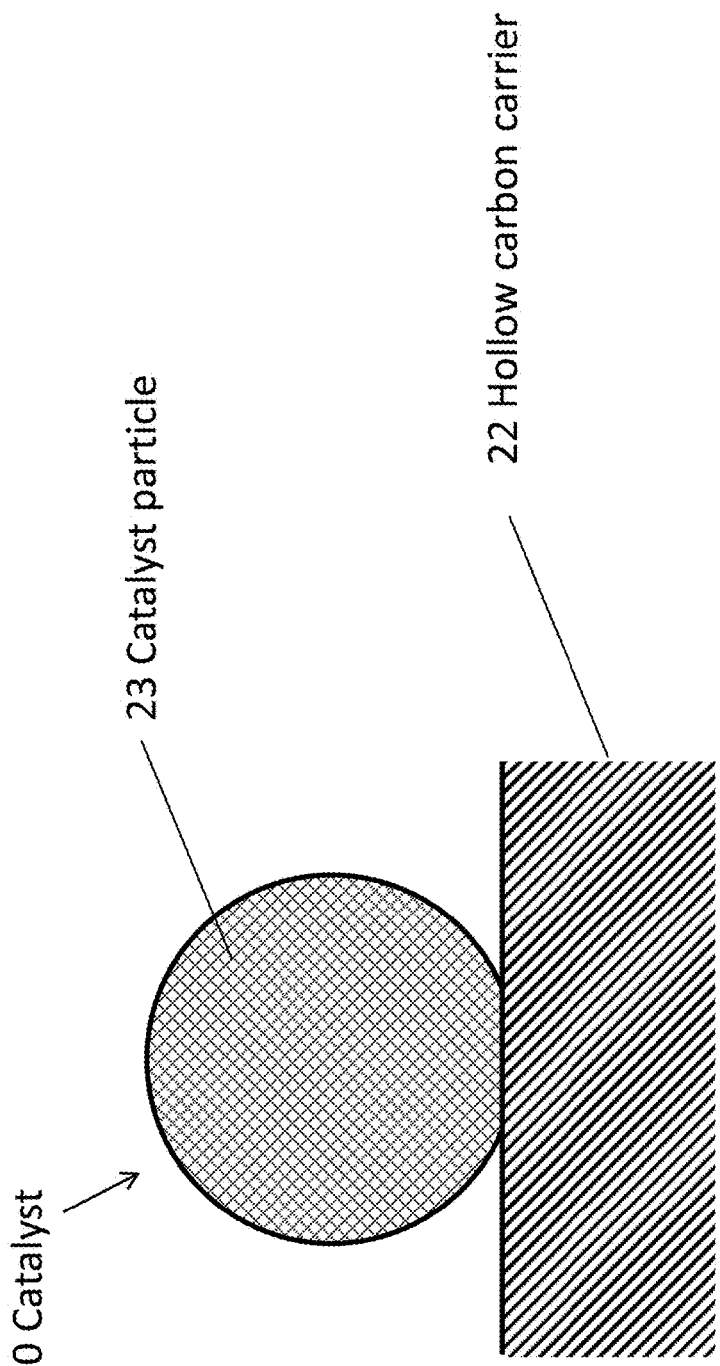
FIG. 3 is an enlarged schematic cross-sectional view showing a schematic configuration of the catalyst for electrode shown in FIG. 2.

As shown in FIGS. 2 and 3, the electrode catalyst 20 includes a carrier 22, which is a hollow carbon carrier, and a catalyst particle 23, which is supported on the carrier 22.

Further, the electrode catalyst 20 shown in FIG. 2 to FIG. 3 preferably satisfies the following conditions from the viewpoint of more reliably obtaining the effect of the present invention.

Here, the catalyst particles 23 are made of Pt (0 valence). However, a layer of Pt oxide may be formed on the surface of the catalyst particles 23 as long as the effects of the present invention can be obtained.

The electrode catalyst 20 preferably has an average value of crystallite size of 3 to 16.0 nm as measured by powder X-ray diffraction (XRD).

Here, the catalyst particles 23 are made of Pt (0 valence). However, a layer of Pt oxide may be formed on the surface of the catalyst particles as long as the effects of the present invention can be obtained.

Further, a Pt supporting ratio of the electrode catalyst 20 is preferably 5.6 to 66.5 wt %.

The carrier 22 is not particularly limited as long as it is a hollow carbon carrier having conductivity, having Nanopores of a pore diameter of 1 to 20 nm, being able to support catalyst particles 23, and having a relatively large surface area.

Further, the carrier 22 has pores having a pore diameter of less than 1 nm (relatively small pores among the pores classified as so-called micropores) and pores having a pore diameter of more than 20 nm and 50 nm or less (relatively large pores among the pores classified as so-called mesopores) within the range in which the effect of the present invention can be obtained.

Furthermore, the carrier 22 is preferably a hollow carbon carrier having good dispersibility in the composition for forming a gas diffusion electrode containing the catalyst for an electrode 20, and having excellent conductivity.

As the hollow carbon carrier, Ketjen black EC300J and Ketjen black EC600JD can be exemplified. For example, as these commercially available products, trade names "carbon EPC", "carbon EPC600JD" and the like (such as those manufactured by Lion Chemical Co., Ltd.) can be exemplified As for Ketjen Black EC300J and Ketjen Black EC600JD, for example, detailed features are described in the document [Characteristics and application development of conductive carbon black "Ketjen Black EC"] published on the internet by the "Functional Carbon Filler Research Society".

As other hollow carbon carriers, a trade name "MCND (Mesoporous Carbon Nano-Dendrite" (manufactured by Nippon Steel Sumitomo Chemical Co., Ltd.), and a trade name "black pearls 2000" (manufactured by Cabot Co., Ltd.) can be exemplified.

Here, from the viewpoint of more reliably obtaining the effect of the present invention, it is preferable that the hollow carbon carrier is at least one of Ketjen black EC300J and Ketjen Black EC600JD. Then, in case of Ketjen black EC300J, from the same viewpoint, the BET specific surface area (nitrogen adsorption specific surface area) of the hollow carbon carrier measured by using nitrogen is preferably 750 to 800 m²/g.

Here, as shown in FIG. 2, the catalyst particle 23 is supported both inside the Nanopores P22 of the carrier 22 and outside the Nanopores P22.

The electrode catalyst 20 satisfies the condition of the following equation (S1) when the electron tomography is measured by 3D-STEM.

$$100\times(N10/N20)\leq 8.0 \tag{S1}$$

Here, in the above equation (S1), N10 is the number of non-contact particles 25 (n101+n102), which is the sum of (I) the number of particles (n101) of noble metal particles that are not in contact with pores having a pore diameter of 1 nm or more that can be confirmed by the electron tomography measurement and (II) the number of noble metal particles (n102) that are not in contact with the hollow carbon carrier 22 itself and exist outside the hollow carbon carrier.

N20 is the number of particles of the catalyst particles 23 supported inside the Nanopores P22 of the carrier 22.

Figure 10:
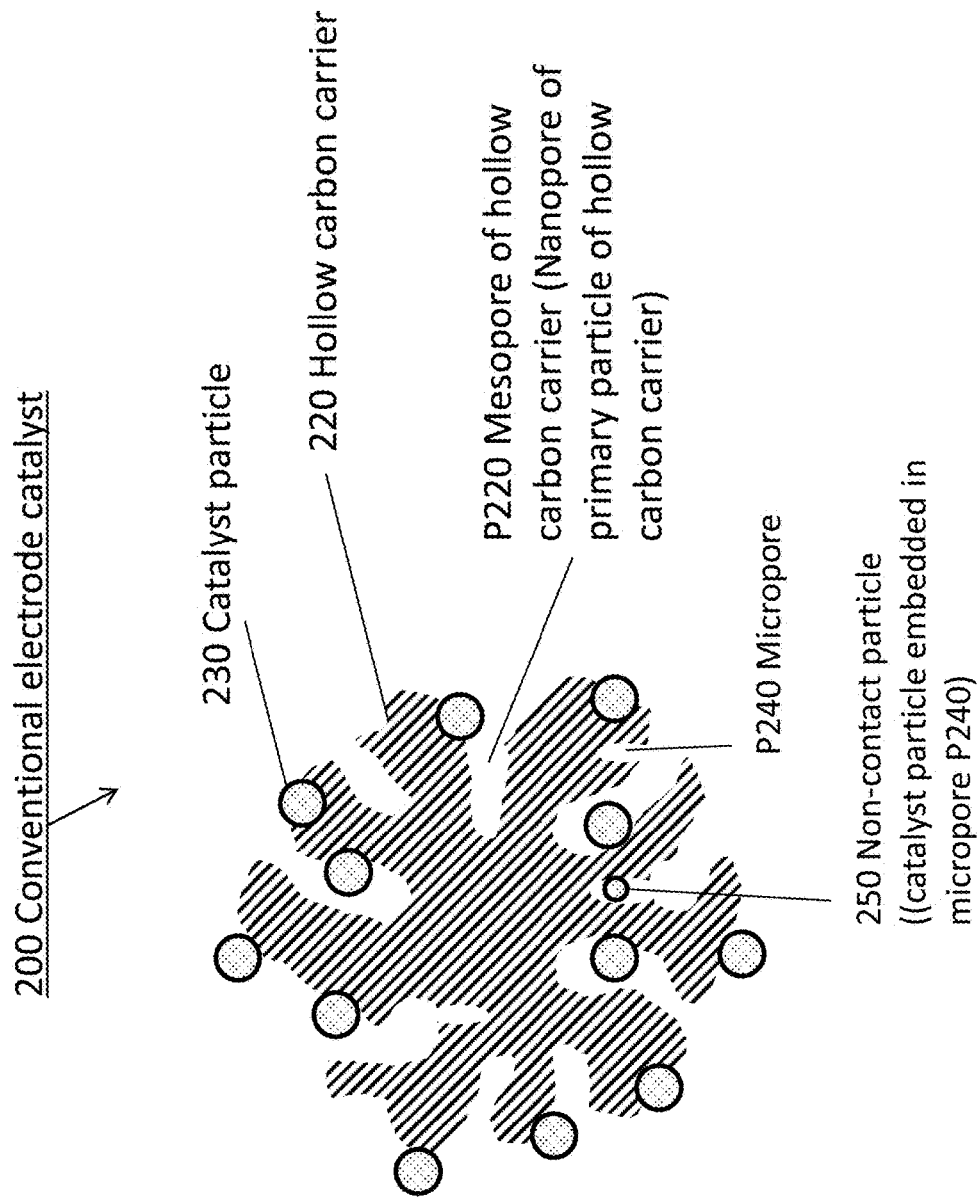
FIG. 10 is a schematic cross-sectional view showing a conventional catalyst for electrode.

The electrode catalyst 20 which satisfies the condition of the equation (S1) has few the non-contact particles 25 (catalyst particle being hard to contribute to the electrode reaction) embedded in the micropores P24 of the carrier 22 as compared with the conventional electrode catalysts 200 (see FIG. 10), and thus there are a relatively large number of highly active catalyst particles 23 are present inside the Nanopores P22 of the carrier 22.

The catalyst particles 23 supported inside the Nanopores P22 of such a carrier 22 are supported on the carrier 22 in a state in which these catalyst particles are hardly in direct contact with the polymer electrolyte present in the catalyst layer (catalyst layer 2c or catalyst layer 1c in FIG. 1). Therefore, the electrode catalyst 20 of the present embodiment reduces the decrease in catalytic activity due to poisoning of the Pt component and can exhibit an excellent catalytic activity when made into an electrode as compared with a conventional electrode catalyst 200. In addition, the electrode catalyst 20 of the present invention also reduces the dissolution of the Pt component from the catalyst particles 23.

It is preferable that the electrode catalyst 20 further satisfies the condition of the following equation (82) when the electron tomography is measured by 3D-STEM.

$$100\times\{N10/(N20+N30)\}\leq 6.0 \tag{S2}$$

Here, in the equation (S2), N10 is synonymous with N10 in the formula (S1),

Further, in the equation (S2), N20 is synonymous with N20 in the formula (S1),

Furthermore, N30 is the number of particles of the catalyst particles 23 supported on the outside of the Nanopores P22 of the carrier 22.

By supporting the catalyst particles on the carrier 22 so as to simultaneously satisfy the conditions of the above equation (S2), the electrode catalyst 20 of the present invention has few the non-contact particles 25 (catalyst particles) embedded in the micropores P24 of the carrier 22 as compared with the conventional electrode catalysts 200, and thus there are a relatively large number of highly active catalyst particles 23 are present inside the Nanopores P22 of the carrier 22. And then, the electrode catalyst 20 of the present invention exhibits more reliably excellent catalytic activity. to contribute to the cost reduction of PEFC.

Furthermore, in the electrode catalyst 20, when an analysis of a particle size distribution of the catalyst particles 23 is performed by using a three-dimensional reconstructed image obtained by an electron beam tomography measurement using an STEM (scanning transmission electron microscopy), it is preferable that with respect to the catalyst particles 23 supported inside the Nanopore P22 of the carrier 22, an average distance from the inlet of the Nanopores P22 to the supported position of the catalyst particles 23 is of 6.0 nm or more. The present inventors consider that the catalyst particles 23 satisfying this condition are supported inside the Nanopores P22 of the carrier and can sufficiently prevent the contact with the polyelectrolyte. Further, it is considered that the catalyst particles 23 satisfying this condition are supported inside the Nanopores P22 of the carrier 22, but exist at an appropriate depth from the inlet of the Nanopores, so that the supply of protons, oxygen gas, and hydrogen gas can be relatively obtained.

Furthermore, in the electrode catalyst 20, when an analysis of a particle size distribution of the catalyst particles 23 is performed by using a three-dimensional reconstructed image obtained by an electron beam tomography measurement using an STEM (scanning transmission electron microscopy), it is more preferable that the catalyst particles 23 supported inside the Nanopore P22 of the carrier 22 exist within a range that a distance from the inlet of the Nanopore P22 to the supported position of the catalyst particles 23 of 0 to 24 nm.

It is considered that the catalyst particles 23 satisfying this condition are supported inside the Nanopores P22 of the carrier 22, but exist at an appropriate depth from the inlet of the Nanopores P22, and the effect of obtaining a sufficient supply of reaction gases and protons can be obtained more reliably, while avoiding contact with the above-mentioned polymer electrolyte.

Further, in the electrode catalysts 20, when an analysis of a particle size distribution of the catalyst particles 23 is performed by using a three-dimensional reconstructed image obtained by an electron beam tomography measurement using an STEM (scanning transmission electron microscopy), it is preferable that a particle size of the catalyst particles 23 supported inside the Nanopore P22 of the carrier 22 is more than 0 nm and 4 nm or less.

It is considered that, since the catalyst particles 23 satisfying this condition have an appropriate particle size to give a sufficient reaction surface area, the electrode reaction can be sufficiently promoted even if the particles are supported inside the Nanopore P22 of the carrier 22.

Further, in the electrode catalysts 20, when an analysis of a particle size distribution of the catalyst particles 23 is performed by using a three-dimensional reconstructed image obtained by an electron beam tomography measurement using an STEM (scanning transmission electron microscopy), it is preferable that a ratio of the catalyst particles 23 supported inside the Nanopore P22 is 50% or more, more preferably 70% or more.

By supporting the catalyst particles 23 on the carrier 22 so as to satisfy the above conditions, a large number of the highly active catalyst particles having a relatively small particle size exist inside the Nanopores P22 of the carrier 22 as compared with the conventional electrode catalysts.

The catalyst particles 23 supported inside the Nanopores P22 of the carrier 22 are supported on the carrier in a state in which these catalyst particles are hardly in direct contact with the polymer electrolyte such as Nafion present in the catalyst layer (catalyst layer 1c or catalyst layer 2c). Therefore, the electrode catalyst 20 reduces the decrease in catalytic activity due to poisoning of the Pt component and can exhibit an excellent catalytic activity when made into an electrode as compared with a conventional electrode catalyst 200. In addition, the electrode catalyst 20 also reduces the dissolution of the Pt component from the catalyst particles 23.

Furthermore, the catalyst layer (catalyst layer 1c or catalyst layer 2c) may further contain other catalysts for electrode (not shown) in addition to the electrode catalyst 20 according to the present invention. For example, the catalyst layer (catalyst layer 1c or catalyst layer 2c) may further contain the above-mentioned "electrode catalyst P" as the other electrode catalysts.

In this case, from the viewpoint of more reliably obtaining the effect of the present invention, it is preferable that the content of the electrode catalyst 20 according to the present invention is 10 wt % or more with respect to the mass of all the constituent materials in the catalyst layer (catalyst layer 1c or catalyst layer 2c). Further, from the viewpoint of further reliably obtaining the effect of the present invention, the content of the electrode catalyst 20 according to the present invention with respect to the mass of all the constituent materials in the catalyst layer (catalyst layer 1c or catalyst layer 2c) is preferably 30 wt % or more, more preferably 50 wt %, further preferably 70 wt % or more, most preferably 90 wt % or more.

Further, in this case, from the viewpoint of more reliably obtaining the effect of the present invention, it is preferable that the content of the electrode catalyst 20 according to the present invention is 10 wt % or more with respect to the mass of all the electrode catalysts in the catalyst layer (catalyst layer 1c or catalyst layer 2c). Further, from the same viewpoint, the content of the electrode catalyst 20 according to the present invention with respect to the mass of all the electrode catalysts in the catalyst layer (catalyst layer 1c or catalyst layer 2c) is preferably 30 wt % or more, more preferably 50 wt %, further preferably 70 wt % or more, most preferably 90 wt % or more.

The method for producing the catalyst for electrode 20 is not particularly limited and can be produced by a known method, except that it includes a "carrier pretreatment step", a "Pt addition step", and a "reduction step" for satisfying the conditions of the equations (1) and (2), and the above-mentioned other conditions.

In the carrier pretreatment step, the carrier 22 is put into deionized water (preferably deionized water having an electric conductivity of 1 μS/cm or less, or more preferably "ultrapure water" described later), and a pH adjuster is further added to prepare a dispersion whose pH is adjusted to 9 to 13. Furthermore, the temperature of the dispersion is kept at 80 to 99° C., preferably 90 to 99° C. for a predetermined time while stirring (however, the state of not boiling is maintained). Then, the temperature of the dispersion is lowered to room temperature.

Thus, the gas inside the Nanopore P22 of the carrier 22 is removed, so that ultrapure water can sufficiently enter into inside the Nanopore P22. Then, in the subsequent "Pt addition step", the Pt raw materials are sufficiently held inside the Nanopore P22 of the carrier 22. Thus, a large number of precursors of the Pt catalyst particle are supported inside the Nanopore P22 of the carrier 22.

Note that "ultrapure water" used as the preparation of the aqueous solution in this carrier pretreatment step is water in which the specific resistance R (reciprocal of the electric conductivity measured by the JIS standard test method (JIS K0552)) represented by the following the equation (3) is 3.0 MΩ·cm or more. In addition, it is preferable that "ultrapure water" has a quality equivalent to "A3" or a clean quality equivalent to or higher than that of "A3" defined in "JISK0557 water used for testing of water and waste".

This ultrapure water is not particularly limited as long as it has an electric conductivity satisfying the relation represented by the following equation (3). For example, ultrapure water produced using an ultrapure water producing apparatus "Milli-Q Series" (manufactured by Merck Co., Ltd.) and "Elix UV Series" (manufactured by Nippon Millipore Co., Ltd.) can be mentioned as the above ultrapure water.

$$R = 1/\rho \qquad (3)$$

In the above equation (3), R represents a specific resistance, and ρ represents an electric conductivity measured by a JIS standard test method (JIS K0552).

The next step of the "carrier pretreatment step" is the "Pt addition step". In this "Pt addition step", an aqueous solution of a water-soluble Pt salt dissolved in ultrapure water is added to the dispersion liquid of the carrier 22 obtained through the "carrier pretreatment step" at room temperature.

The next step of the "Pt addition step" is the "reduction step". In this "reduction step", the temperature of the liquid obtained through the "Pt addition step" is raised to 50° C. or higher, and an aqueous solution in which a water-soluble reducing agent (preferably an alkaline water-soluble reducing agent) is dissolved is added. After the addition of the reducing agent, the liquid temperature is maintained at 50° C. or higher for a predetermined period of time to allow the reduction reaction to proceed, and then the temperature of the liquid is lowered to room temperature.

The next step of the "reduction step" is the "washing step". In this "washing step", the solid component and the liquid component in the liquid obtained through the "reduction step" are separated, and the solid content (a mixture of a Pt/C catalyst and other impurities) is washed. For example, the solid component in the liquid obtained through the "reduction step" may be separated from the liquid component by using a filtering means such as filter paper or a filter cloth. The solid content may be washed with the above-mentioned ultrapure water, a pure water (specific resistance R represented by the above equation (3) is 0.1 MΩcm or more and less than 3.0 MΩcm), or a pure warm water (temperature of pure water being 40 to 80° C.) may be used. For example, when the pure warm water is used, the filtrate is washed repeatedly until the electrical conductivity after washing becomes less than 10 µS/cm.

The next step after the "washing step" is the "drying step". In this "drying step", water is separated from the solid component (mixture of Pt/C catalyst and water) obtained through the "washing step". First, the solid component is air-dried, and then dried in a dryer at a predetermined temperature for a predetermined time.

The next step after the "drying step" is the "crushing step". In this "crushing step", the solid component (Pt/C catalyst) obtained from the "drying step" is crushed to the catalyst powder with a crushing means such as a mixer.

The polymer electrolyte contained in the catalyst layer 1c and the catalyst layer 2c is not particularly limited as long as it has hydrogen ion conductivity, and known ones can be used. For example, the polymer electrolyte can exemplify a known perfluorocarbon resin having a sulfonic acid group and a carboxylic acid group. Examples of easily available polymer electrolytes having hydrogen ion conductivity include Nafion (registered trademark, manufactured by DuPont), Aciplex (registered trademark, manufactured by Asahi Kasei Co., Ltd.), and Flemion (registered trademark, manufactured by Asahi Glass Co., Ltd.).

Then, at least one of the catalyst layer 1c of the cathode 1 and the catalyst layer 2c of the anode 2 shown in FIG. 1 has a mass ratio N/C of the mass N of the polymer electrolyte to the mass C of the carrier 22 of 0.5 to 1.2, and more preferably a mass ratio N/C of 0.7 to 1.0.

(Gas Diffusion Layer (GDL))

The gas diffusion layer 1gd provided in the cathode 1 shown in FIG. 1 is a layer provided for supplying an oxidant gas (e.g., oxygen gas, air) to the catalyst layer 1c. In addition, the gas diffusion layer 1gd serves to support the catalyst layer 1c.

In addition, the gas diffusion layer 2gd provided in the anode 2 is a layer provided for supplying a reducing agent gas (e.g., hydrogen gas) to the catalyst layer 2c. And, the gas diffusion layer 2gd serves to support the catalyst layer 2c.

The gas diffusion layer (1gd) shown in FIG. 1 has a function and structure to pass hydrogen gas or air (oxygen gas) well to reach the catalyst layer. Therefore, it is preferable that the gas diffusion layer has water repellency. For example, the gas diffusing layer has a water repellent component such as polyethylene terephthalate (PTFE).

The member which can be used for the gas diffusion layer (1gd) is not particularly limited, and a known member can be used. For example, preferably, there are exemplified carbon paper and other material, in which carbon paper is used as a main material and auxiliary materials including carbon powder, ion exchange water, and a polyethylene terephthalate dispersion as a binder is applied on the carbon paper.

(Water Repellent Layer (MPL))

As shown in FIG. 1, a water repellent layer (MPL) 1m is arranged between the gas diffusion layer 1gd and the catalyst layer 1c at the cathode 1. The water repellent layer 1m has electronic conductivity, water repellency, and gas diffusing property, and is provided for facilitating diffusion of the oxidant gas into the catalyst layer 1c and discharge of the reaction product water generated in the catalyst layer 1c. The configuration of the water repellent layer 1m is not particularly limited, and a known configuration can be employed.

(Polymer Electrolyte Membrane (PEM))

The polymer electrolyte membrane (PEM) 3 shown in FIG. 1 is not particularly limited as long as it has hydrogen ion conductivity, and a known one conventionally used in PEFC can be employed. For example, it may be a membrane including as a constituent a polymer electrolyte exemplified above as ones contained in the catalyst layer 1c and the catalyst layer 2c.

<Modified Embodiment of MEA>

While a preferred embodiment of the MEA of the present invention (and the catalyst layer of the present invention, the gas diffusion electrode of the present invention) is described above, the MEA of the present invention is not limited to the configuration of the MEA 10 shown in FIG. 1.

Figure 4:
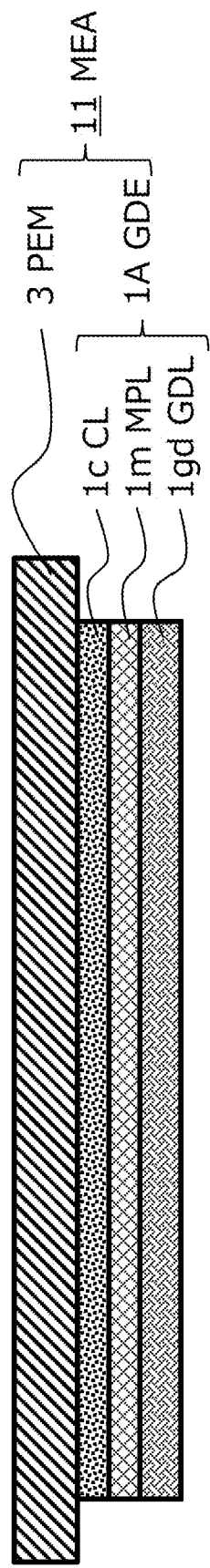
FIG. 4 is a schematic cross-sectional view showing another preferred embodiment of the MEA of the present invention.

For example, the MEA of the present invention may have the configuration of the MEA 11 shown in FIG. 4.

FIG. 4 is a schematic cross-sectional view illustrating another preferred embodiment of the MEA of the present invention. The MEA 11 shown in FIG. 4 has a configuration in which the gas diffusing electrode (GDE) 1A having the same configuration as that of the cathode 1 in the MEA10 shown in FIG. 1 is arranged on only one side of the polymer electrolyte membrane (PEM) 3. However, the catalyst layer 1c of the gas diffusion electrode (GDE) 1A has a configuration of the catalyst layer of the present invention. In other words, the catalyst layer 1c of the GDE 1A has a mass ratio N/C of the mass N of the polymer electrolyte to the mass C of the carrier 22 of the catalyst for electrode 20 of 0.5 to 1.2, more preferably 0.7 to 1.0.

<Membrane-Electrode Assembly (CCM)>

Next, a preferred embodiment of the membrane-electrode assembly (CCM) of the present invention will be described.

Figure 5:
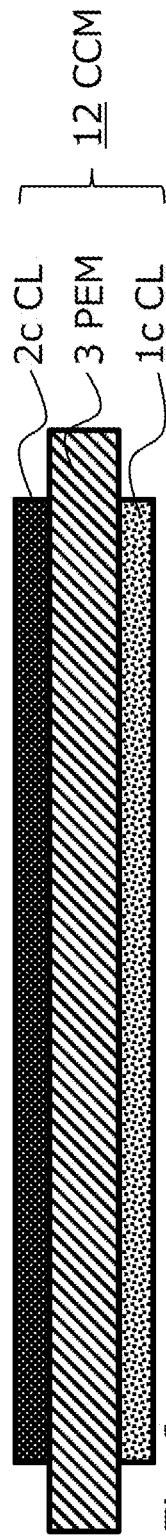
FIG. 5 is a schematic cross-sectional view showing a preferred embodiment of the CCM of the present invention.

FIG. 5 is a schematic cross-sectional view showing a preferred embodiment of the CCM of the present invention. The CCM 12 shown in FIG. 5 has a configuration in which a polymer electrolyte membrane (PEM) 3 is arranged between the cathode catalyst layer 1c and the anode catalyst layer 2c. Then, at least one of the cathode catalyst layer 1c and the anode catalyst layer 2c has a configuration of the catalyst layer of the present invention. In other words, at least one of the cathode catalyst layer 1c and the anode catalyst layer 2c has a mass ratio N/C of the mass N of the polymer electrolyte to the mass C of the carrier of the electrode catalyst 20 of 0.5 to 1.2, more preferably 0.7 to 1.0.

<Modified Embodiment of Membrane-Electrode Assembly (CCM)>

While a preferred embodiment of the CCM of the present invention has been described above, the CCM of the present invention is not limited to the configuration of the CCM 12 shown in FIG. 5.

Figure 6:
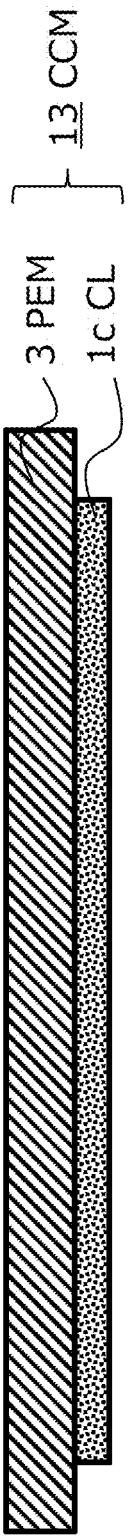
FIG. 6 is a schematic cross-sectional view showing another preferred embodiment of the CCM of the present invention.

For example, the CCM of the present invention may have a configuration of the CCM 13 shown in FIG. 6.

Figure 7:
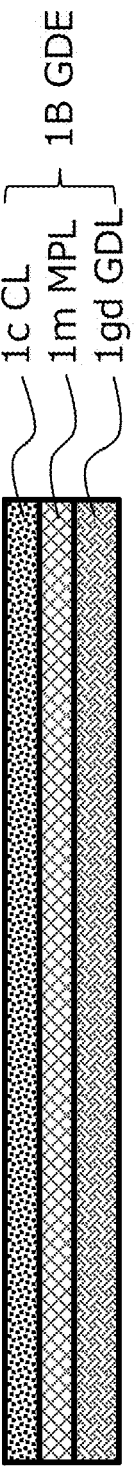
FIG. 7 is a schematic cross-sectional view showing a preferred embodiment of the GDE of the present invention.

FIG. 7 is a schematic cross-sectional view illustrating another preferred embodiment of the CCM of the present invention. The CCM 13 shown in FIG. 6 has a configuration in which the catalyst layer 1c having the same configuration as that of the cathode 1 in the CCM 12 shown in FIG. 5 is arranged on only one side of the polymer electrolyte membrane (PEM) 3. However, the catalyst layer 1c of the gas diffusion electrode (GDE) 1A has a configuration of the catalyst layer of the present invention. In other words, the catalyst layer 1c of the CCM 13 has a mass ratio N/C of the mass N of the polymer electrolyte to the mass C of the carrier 22 of the electrode catalyst 20 of 0.5 to 1.2, more preferably 0.7 to 1.0.

<Gas Diffusion Electrode (GDE)>

Next, a preferred embodiment of the gas diffusion electrode (GDE) of the present invention will be described.

Figure 8:
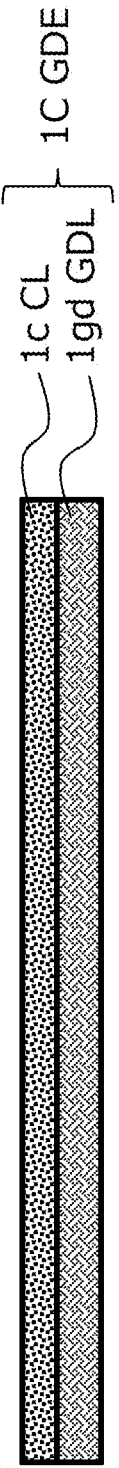
FIG. 8 is a schematic cross-sectional view showing another preferred embodiment of the GDE of the present invention.

FIG. 8 is a schematic cross-sectional view showing a preferred embodiment of the GDE of the present invention. The gas diffusion electrode (GDE) 1B shown in FIG. 7 has the same configuration as that of the cathode 1 mounted on the MEA 10 shown in FIG. 1. However, the catalyst layer 1c of the gas diffusion electrode (GDE) 1B has a configuration of the catalyst layer of the present invention. In other words, the catalyst layer 1c of the gas diffusion electrode (GDE) 1B has a mass ratio N/C of the mass N of the polymer electrolyte to the mass C of the carrier of the electrode catalyst 20 of 0.5 to 1.2, more preferably 0.7 to 1.0.

<Modified Embodiment of Gas Diffusion Electrode (GDE)>

While a preferred embodiment of the GDE of the present invention has been described above, the GDE of the present invention is not limited to the configuration of the GDE 1B shown in FIG. 7.

For example, the GDE of the present invention may have the composition of GDE 1C shown in FIG. 8.

Figure 9:
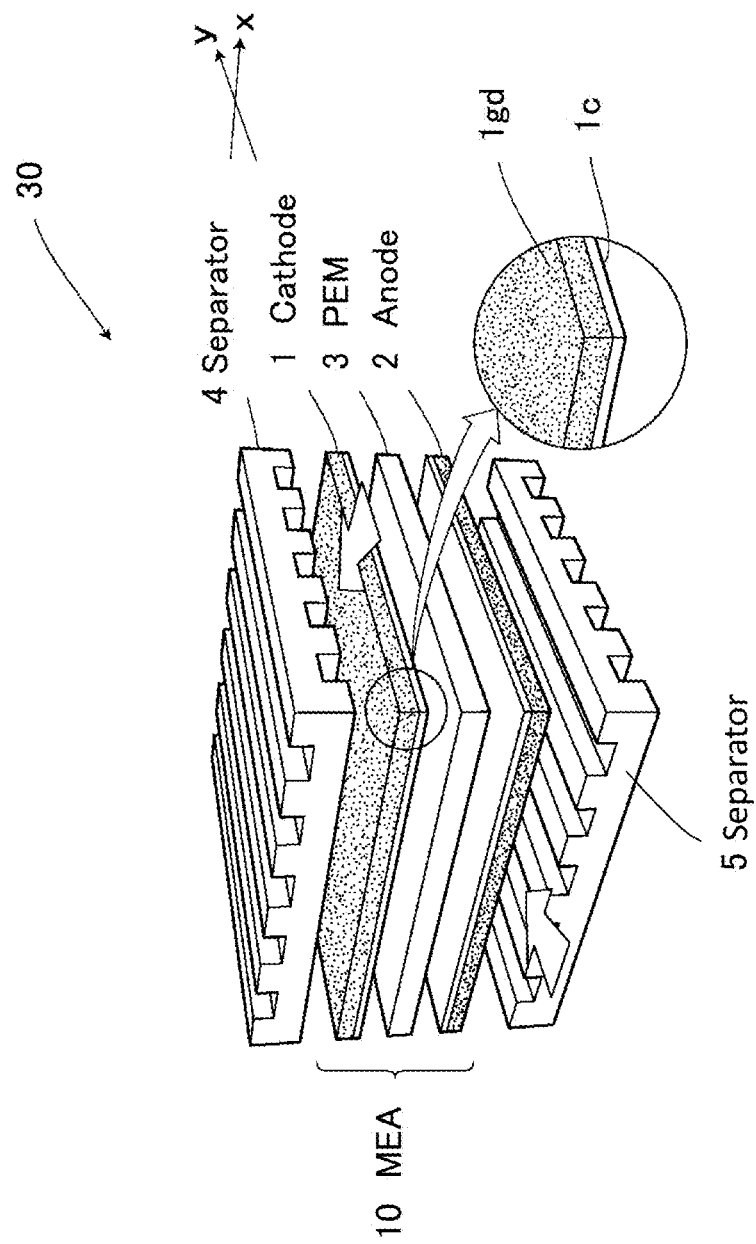
FIG. 9 is a schematic diagram showing one preferred embodiment of the fuel cell stack of the present invention.

FIG. 9 is a schematic cross-sectional view illustrating another preferred embodiment of the GDE of the present invention. The GDE 1C shown in FIG. 8 has a configuration in which the water repellent layer (MPL) is not arranged between the catalyst layer 1c and the gas diffusion layer 1gd as compared with the GDE 1B shown in FIG. 8.

<Composition for Forming Catalyst Layer>

Next, a preferred embodiment of the composition for forming catalyst layer of the present invention will be described.

A composition for forming catalyst layer of the present embodiment includes the electrode catalyst 20, a polymer electrolyte, and a main component, and has a mass ratio N/C of mass N of polymer electrolyte to mass C of carrier 22 of the electrode catalyst 20 of 0.5 to 1.2, more preferably 0.7 to 1.0.

Here, the composition of the liquid including the polymer electrolyte is not particularly limited. For example, a liquid including a polymer electrolyte may contain a polymer electrolyte having hydrogen ion conductivity described above, water, and an alcohol.

The composition ratio of the electrode catalyst 20, the polymer electrolyte, and other components (water, alcohol, and the like) included in the composition for forming catalyst layer is appropriately set so that the dispersion state of the electrode catalyst 20 in the obtained catalyst layer becomes good and the power generation performance of the MEA 10 including the catalyst layer can be improved.

The composition for forming catalyst layer can be prepared by mixing a liquid including the electrode catalyst 20 and the polymer electrolyte and stirring the mixture. From the viewpoint of adjusting applicability, a polyhydric alcohol such as glycerin and/or water may be contained. When the liquid including the electrode catalyst 20, the polymer electrolyte is mixed, a pulverizing and mixing machine such as a ball mill, an ultrasonic disperser and the like can be used.

At least one of the catalyst layer 1c of the cathode 1 and the catalyst layer 2c of the anode 2 shown in FIG. 1 can be formed using a preferred embodiment of the composition for forming catalyst layer of the present invention.

(Method for Producing Gas Diffusion Electrode)

Next, an example of a method of producing gas diffusion electrode of the present invention will be described. It is sufficient that the gas diffusion electrode is formed so as to include the catalyst layer of the present invention, and a known method can be employed for the producing method. It can be more reliably produced by using the composition for forming catalyst layer of the present invention.

For example, it may be produced by coating a composition for forming catalyst layer on a gas diffusion layer (or a water repellent layer of a laminate in which a water repellent layer is formed on a gas diffusion layer) and drying the composition.

<Fuel Cell Stack>

FIG. 9 is a schematic diagram illustrating one preferred embodiment of the fuel cell stack of the present invention.

The fuel cell stack 30 illustrated in FIG. 9 has a configuration in which the MEA 10 shown in FIG. 1 is a unit cell and a plurality of the unit cells are stacked. Further, the fuel cell stack 30 has a configuration in which the MEA10 is arranged between the separator 4 and the separator 5. A gas flow passage is formed in the separator 4 and the separator 5, respectively.

EXAMPLES

The present invention is further illustrated by the following examples, which are not intended to limit the present invention.

(I) Preparation of the Electrode Catalyst to be Used for the Catalyst Layer of the Cathode of MEA
(1) Production of Pt/C Catalyst to be Used for the Cathode of MEA of Example 1
[Pt Catalyst Particle-Supported Carbon Catalyst "Pt/C Catalyst" Powder]

Powder of Pt/C catalyst powder in which catalyst particles made of Pt are supported on a carbon black powder {Pt carrying ratio 49.0 wt %, trade name "SA50wBK", manufactured by N.E. CHEMCAT)} was prepared.

The powder of this Pt/C catalyst (hereinafter, referred to as "Pt/C catalyst A" if necessary) was prepared in the following procedures.

(First Step (Carrier Pretreatment Step))

A dispersion liquid, in which a commercially available hollow carbon carrier {manufactured by Lion Co., Ltd., trade name "Carbon ECP" (Ketjen Black EC300J), a specific surface area of 750 to 800 $m^2/g$} was dispersed in the aqueous solution adjusted to pH=9 to 13 (prepared by adding a pH adjuster to ultrapure water), was held at 90 to 99° C. for about 0.5 hours while stirring (although a not boiled state was retained).

Note that "ultrapure water" used in this first step (carrier pretreatment step) was a water having a specific resistance R (reciprocal of electric conductivity measured by a JIS standard test method (JIS K0552)) represented by the following equation (3) of 3.0 MΩcm or more. In addition, ultrapure water had a water quality equivalent to or higher than that of A3 specified in JISK0557 Water for Testing Water and Wastewater.

This ultrapure water was produced using an ultrapure water producing apparatus "Milli-Q Series" (manufactured by Merck Co., Ltd.) and "Elix UV Series" (manufactured by Nippon Millipore Co., Ltd.).

$$R=1/\rho \qquad (3)$$

In the above general equation (3), R represents a specific resistance, and ρ represents an electric conductivity measured by a JIS standard test method (JIS K0552).

(Second Step (Pt Addition Step))

After preparing a mixed solution by adding an aqueous solution of a water-soluble Pt salt in ultrapure water to the dispersion obtained through the first step, the pH was adjusted to 7 to 12, and the mixture was stirred while maintaining a predetermined temperature of 50° C. or higher for a predetermined time.

(Third Step (Reduction Step))

By adding an aqueous solution in which an alkaline water-soluble reducing agent is dissolved to the liquid obtained through the second step, the Pt ions in the mixed liquid were reduced to obtain the Pt catalyst particle-supporting carbon "Pt/C" powder.

(Fourth Step (Washing Step))

By using a filter paper, the solid component and the liquid component in the liquid obtained through the "third step" were separated. Next, the solid content (a mixture of the Pt/C catalyst and other impurities) remaining on the filter paper was washed with the above-mentioned pure water and pure warm water. First, washing with pure water was performed. This washing was repeated until the electric conductivity of the filtrate after washing became less than 20 μS/cm. Next, washing with pure warm water was performed. This washing was repeated until the electric conductivity of the filtrate after washing became less than 10 μS/cm.

(Fifth Step (Drying Step))

The solid component (mixture of Pt/C catalyst and water) on the filter paper obtained through the "fourth step" was air-dried in the air in this state. After this air drying, the solid component on the filter paper was transferred to a magnetic dish and dried in an electric dryer at a predetermined temperature of 60° C. or higher for a predetermined time.

(Sixth Step (Crushing Step))

The solid component (Pt/C catalyst) obtained in the "fifth step" was crushed by using a mixer to obtain a powder of Pt/C catalyst A.

<Measurement of Supporting Ratio (ICP Analysis)>

For this Pt/C catalyst A, the Pt supporting ratio (wt %) was determined by the following methods.

The Pt/C catalyst A was immersed in aqua regia to dissolve the metal. The carbon as the insoluble component was then removed from the aqua regia. Next, the aqua regia from which the carbon was removed was analyzed by ICP.

As a result of the ICP analysis, this Pt/C catalyst A had the Pt supporting ratio of 49.0 wt %.

<Surface Observation/Structure Observation of Electrode Catalyst>

In order to observe the three-dimensional structure of this Pt/C catalyst, the electron tomography measurement was carried out by using the "USAL-KM3D analysis method" with the STEM (scanning transmission electron microscope) at UBE Scientific Analysis Center Co., Ltd.

The electron tomography measurement with the STEM (scanning transmission electron microscope) was carried out so as to satisfy the measurement conditions (P1) to (P3) in the sample to be measured preparation method and conditions described above. More detailed information is described hereinbelow.

Figure 11:
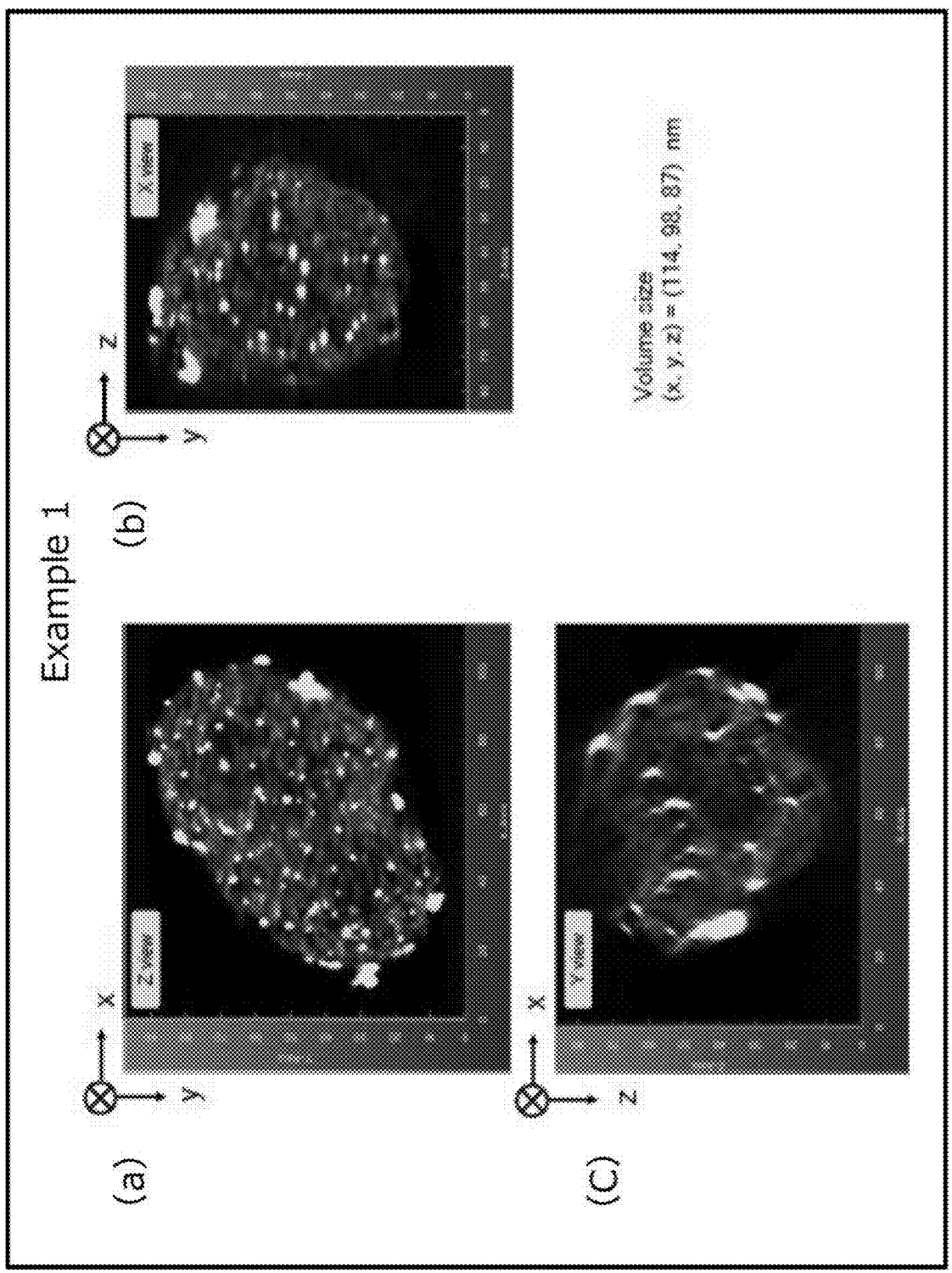
FIG. 11 is an STEM image showing 3D-electron beam tomography (electron tomography) measurement conditions (volume size) using an STEM of the catalyst for electrode of Example 1.

STEM apparatus: JEM-ARM200F Atomic Resolution Analytical Electron Microscopy Made by JEOL Data analysis software: 3D reconfiguration software Composer, 3D data visualization software Visualizer-kai by System Infrontia, image analysis software Colorist Measurement conditions
Acceleration voltage: 60 kV
Observation magnification 800,000 to 1,000.000 times
Tilt angle of the sample to be measured: −80° to +80°
Tilt step angle of the sample to be measured: 2°
Pixel Count 512×512 pixels 512×512 pixels
Pixel size: 0.350 to 0.500 nm/pixel
Volume Size: as shown in FIG. 11.

With respect to the Pt/C catalyst A, by image analysis of a three-dimensional reconstructed image (3D-STEM image) obtained by electron beam tomography (electron tomography) measurement using an STEM (scanning transmission electron microscopy), the Pt catalyst particles (hereinafter, inner particles) present inside the carbon carrier and the Pt catalyst particles (hereinafter, outer particles) present on the surface portion of the carbon carrier were separated, and the particle size distribution of the Pt catalyst in each region was calculated.

Figure 12:
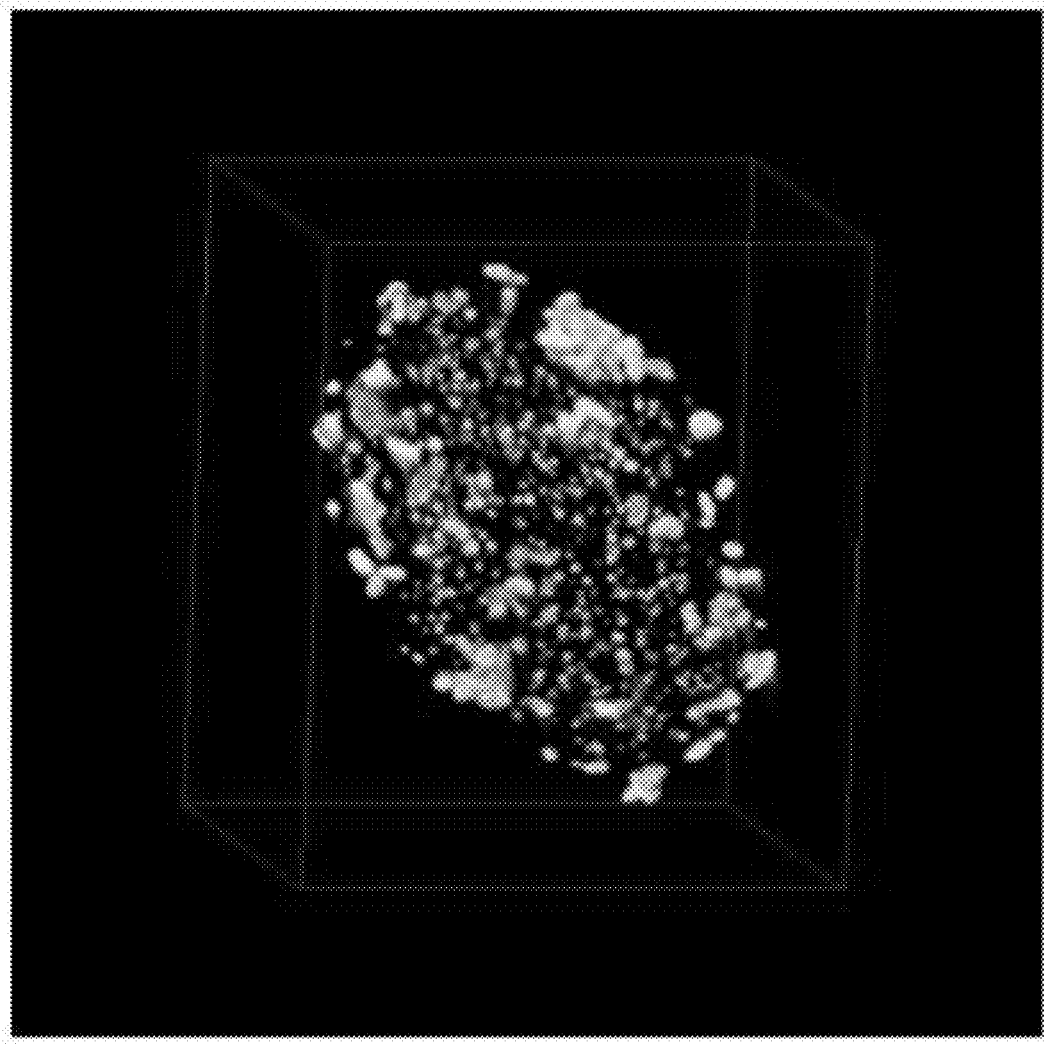
FIG. 12 is a 3D-STEM image (three-dimensional reconstructed image) of the catalyst for electrode of Example 1.

A three-dimensional reconstructed image (3D-STEM image) of the Pt/C catalyst A is shown in FIG. 12.

Figure 13:
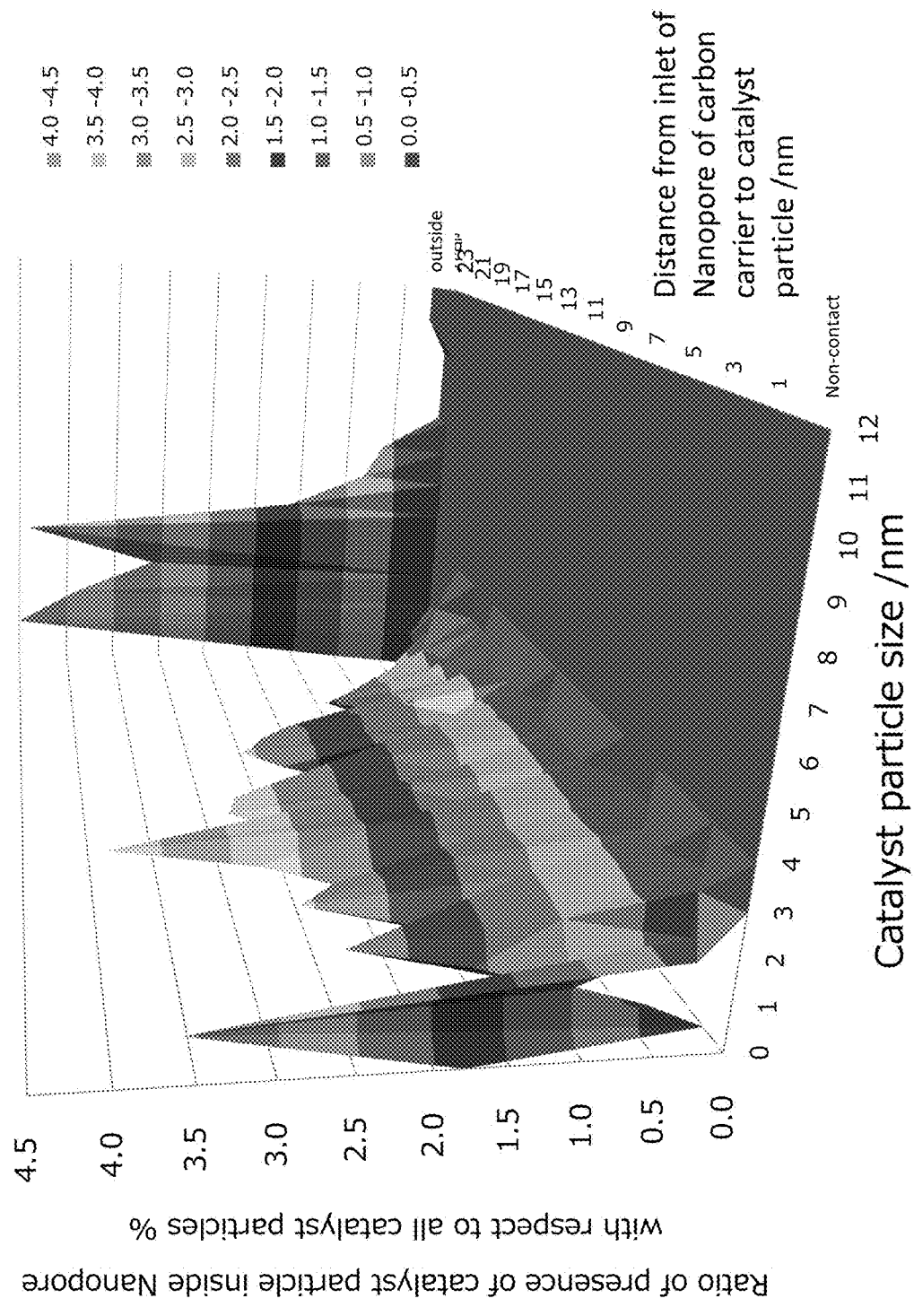
FIG. 13 is a graph showing the distribution state of Pt catalyst particle located outside and inside Nanopore of carbon carrier in the pore depth direction catalyst particles obtained by image analysis of the 3D-STEM image of the catalyst of Example 1 shown in FIG. 12.

A graph showing the distribution state of Pt catalyst particle located outside and inside Nanopore of carbon carrier in the pore depth direction catalyst particles obtained by image analysis of the 3D-STEM image of the catalyst of Example 1 shown in FIG. 12 is shown in FIG. 13.

Figure 14:
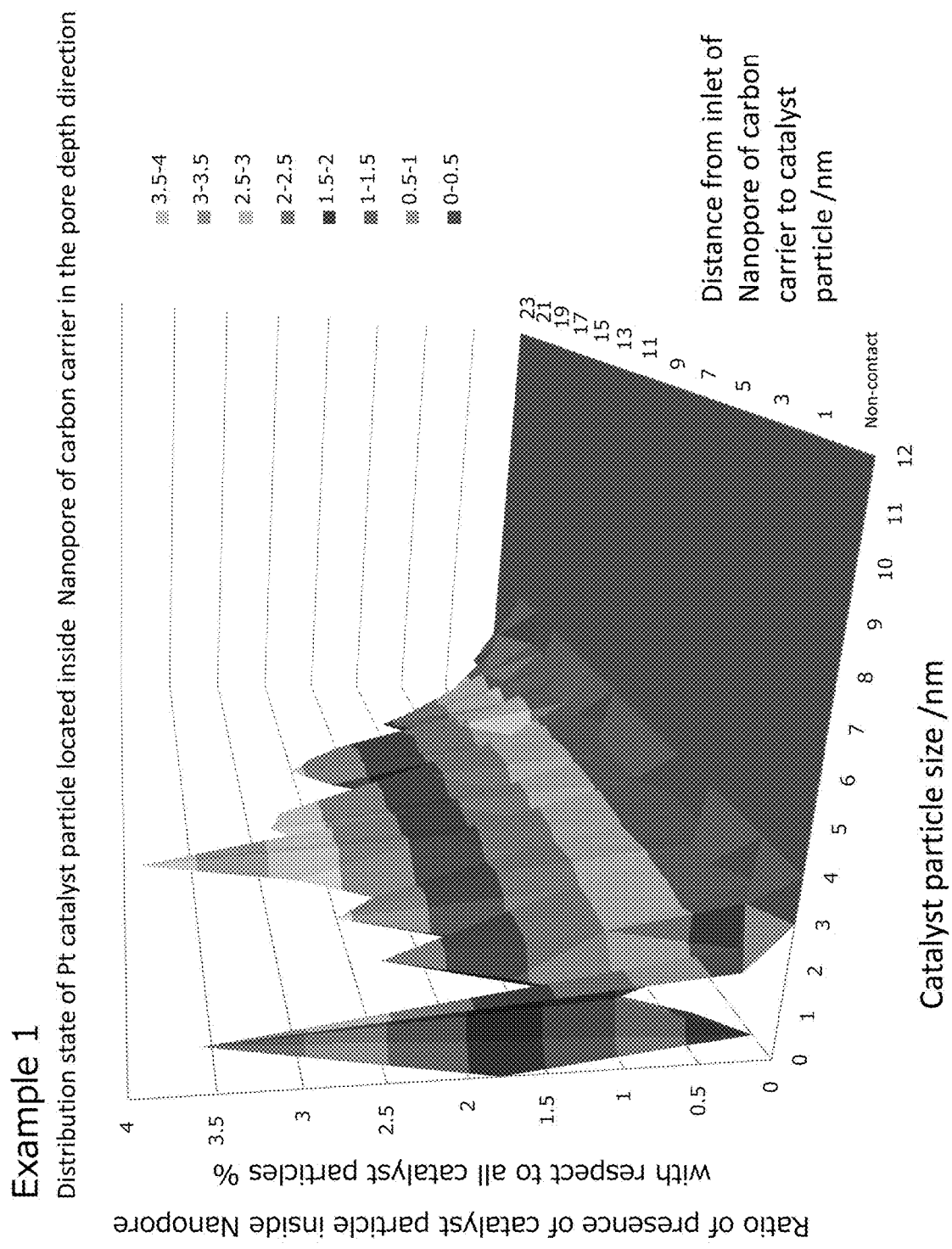
FIG. 14 is a graph showing the distribution state of Pt catalyst particle located inside Nanopore of carbon carrier in the pore depth direction catalyst particles obtained by image analysis of the 3D-STEM image of the catalyst of Example 1 shown in FIG. 12.

A graph showing the distribution state of Pt catalyst particle located inside Nanopore of carbon carrier in the pore depth direction catalyst particles obtained by image analysis of the 3D-STEM image of the catalyst of Example 1 shown in FIG. 12 is shown in FIG. 14.

Figure 15:
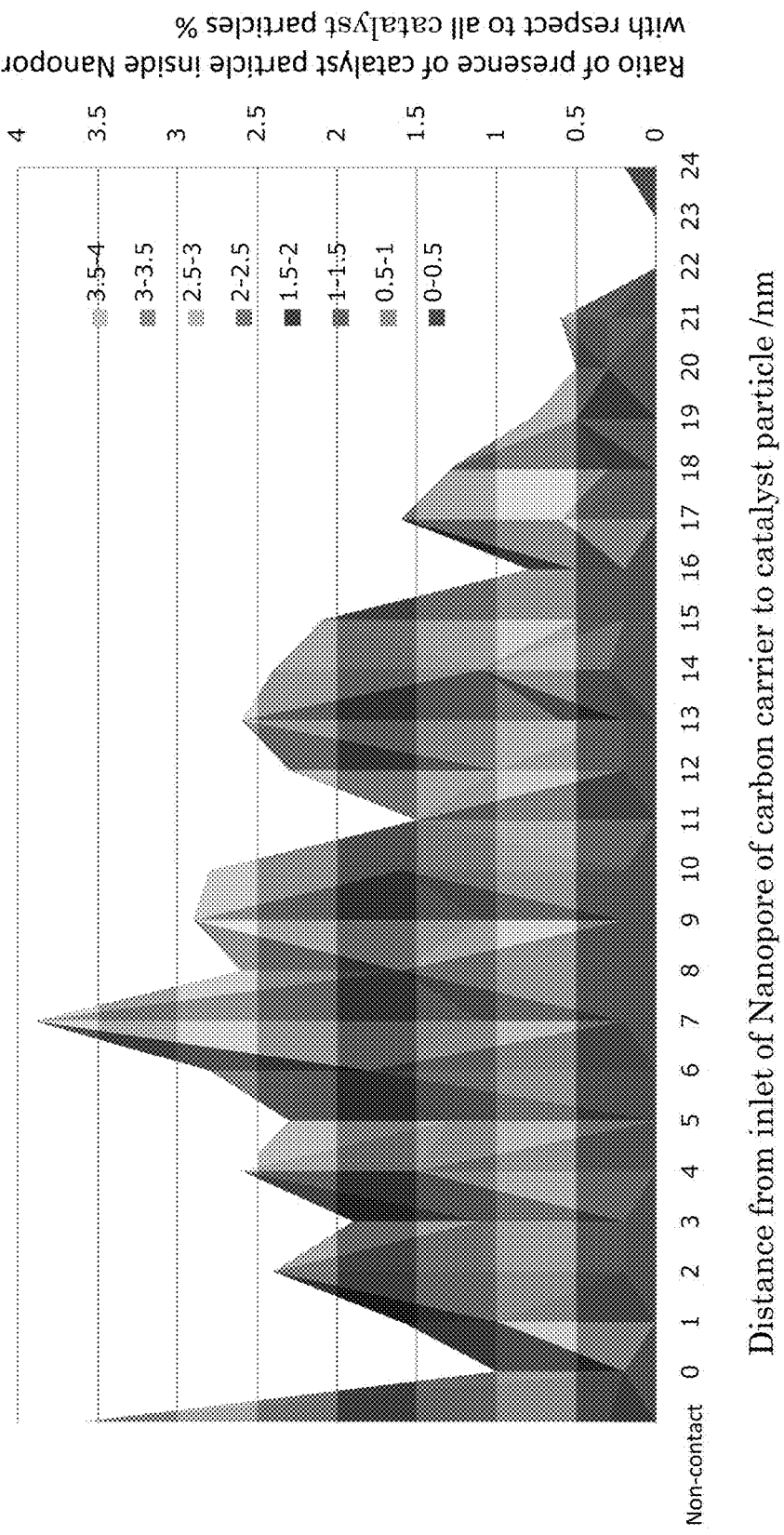
FIG. 15 is a graph showing the distribution state of Pt catalyst particle located inside Nanopore of carbon carrier in the pore depth direction catalyst particles obtained by image analysis of the 3D-STEM image of the catalyst of Example 1 shown in FIG. 12.

A graph showing the distribution state of Pt catalyst particle located inside Nanopore of carbon carrier in the pore depth direction catalyst particles obtained by image analysis of the 3D-STEM image of the catalyst of Example 1 shown in FIG. 12 is shown in FIG. 15.

The 3D-STEM image was obtained by reconstructing a plurality of two-dimensional STEM images obtained by stepwise tilting the sample stage under the above measuring conditions.

Further, the image analysis (particle size analysis) of three-dimensional reconstructed image (3D-STEM image) was carried out by the following procedures. The regions of the catalytic particles were first selected from the three-dimensional reconstructed images, and the respective catalytic particles were labeled (not shown). Next, the volume of the labeled Pt catalyst particles was obtained, the diameter of a sphere having the same volume as this volume (the equivalent diameter of the sphere) was calculated, and the particle size distribution (FIG. 13, FIG. 14, FIG. 15) was obtained.

Here, the sphere equivalent diameter was calculated by rounding up the value below the decimal point (value below 1 nm) using the unit of nm.

With respect to this Pt/C catalyst A, the ratio of the catalyst particles supported inside the Nanopores of the carrier and the ratio of the catalyst particles supported outside the Nanopores of the carrier were determined. The values of N10, N20, N30 were also obtained. The results are shown in Table 1 and Table 2.

In the electron tomography measurement of the electrode catalyst of Example 1, the presence of the noble metal particles of (II) described above was not confirmed. That is, there was no noble metal particle that was not in contact with the hollow carbon carrier itself and existed outside the carrier (n102=0).

Furthermore, the mean value of the particle size of the catalyst particles of the Pt/C catalyst A measured from the STEM image was 2.1 nm (the average value of the particle size of the catalyst particles inside the Nanopores: 1.7 nm, the average value of the particle size of the catalyst particles outside the Nanopores: 3.4 nm).

(2) Preparation of Pt/C Catalyst Powder Used for the Cathode of MEA of Comparative Example 1

As a Pt/C catalyst, a Pt/C catalyst manufactured by N. E. CHEMCAT with a Pt supporting ratio of 50 wt % (trade name: "SA50BK") was prepared. As the carrier of this Pt/C catalyst, a commercially available hollow carbon carrier (manufactured by Lion Co., Ltd., trade name "Carbon ECP" (registered trademark) (Ketchen Black EC300J), specific surface area of 750 to 800 $m^2/g$) was used.

<Surface Observation/Structure Observation of Catalyst for Electrode>

In order to observe the three-dimensional structure of this Pt/C catalyst of Comparative Example 1, in the same method and conditions as the Pt/C catalyst of Example 1, The electron tomography measurement was carried out by using the "USAL-KM3D analysis method" with the STEM (scanning transmission electron microscope) at UBE Scientific Analysis Center Co., Ltd.

Figure 16:
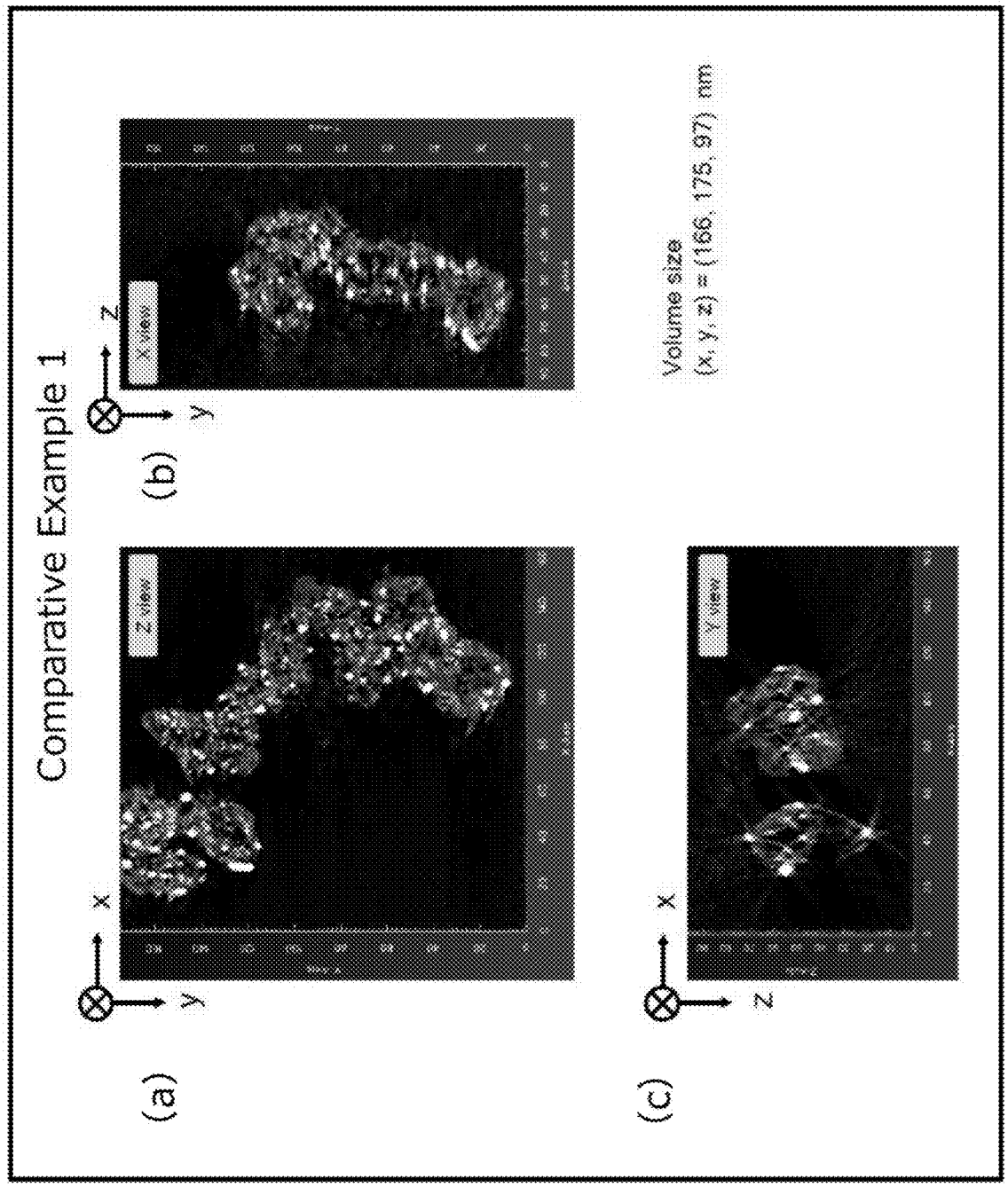
FIG. 16 is an STEM image showing 3D-electron beam tomography (electron tomography) measurement conditions (volume size) using an STEM of the catalyst for electrode of Comparative Example 1.

An STEM image showing 3D-electron beam tomography (electron tomography) measurement conditions (volume size) using an STEM of the Pt/C catalyst of Comparative Example 1 is shown in FIG. 16.

Figure 17:
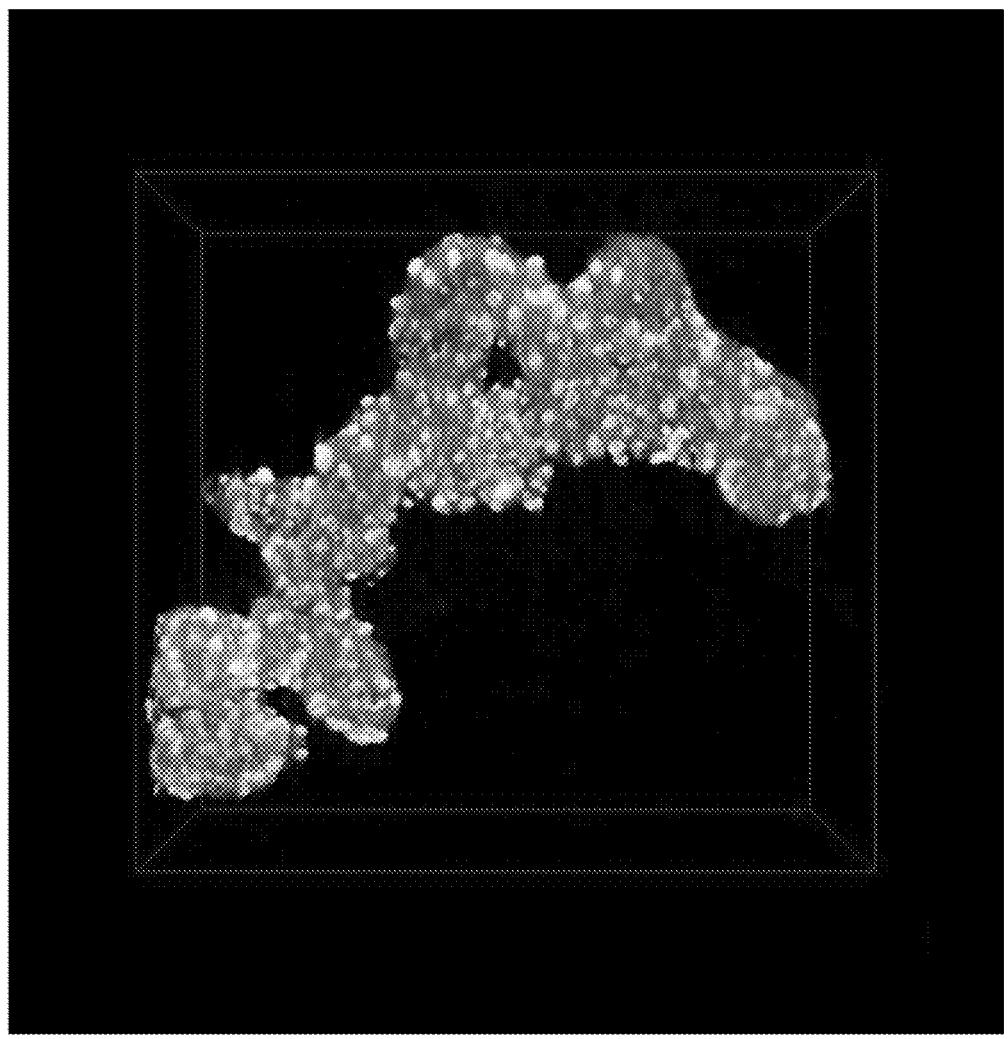
FIG. 17 is a 3D-STEM image (three-dimensional reconstructed image) of the catalyst for electrode of Comparative Example 1.

A 3D-STEM image (three-dimensional reconstructed image) of the Pt/C catalyst of Comparative Example 1 is shown in FIG. 17.

Figure 18:
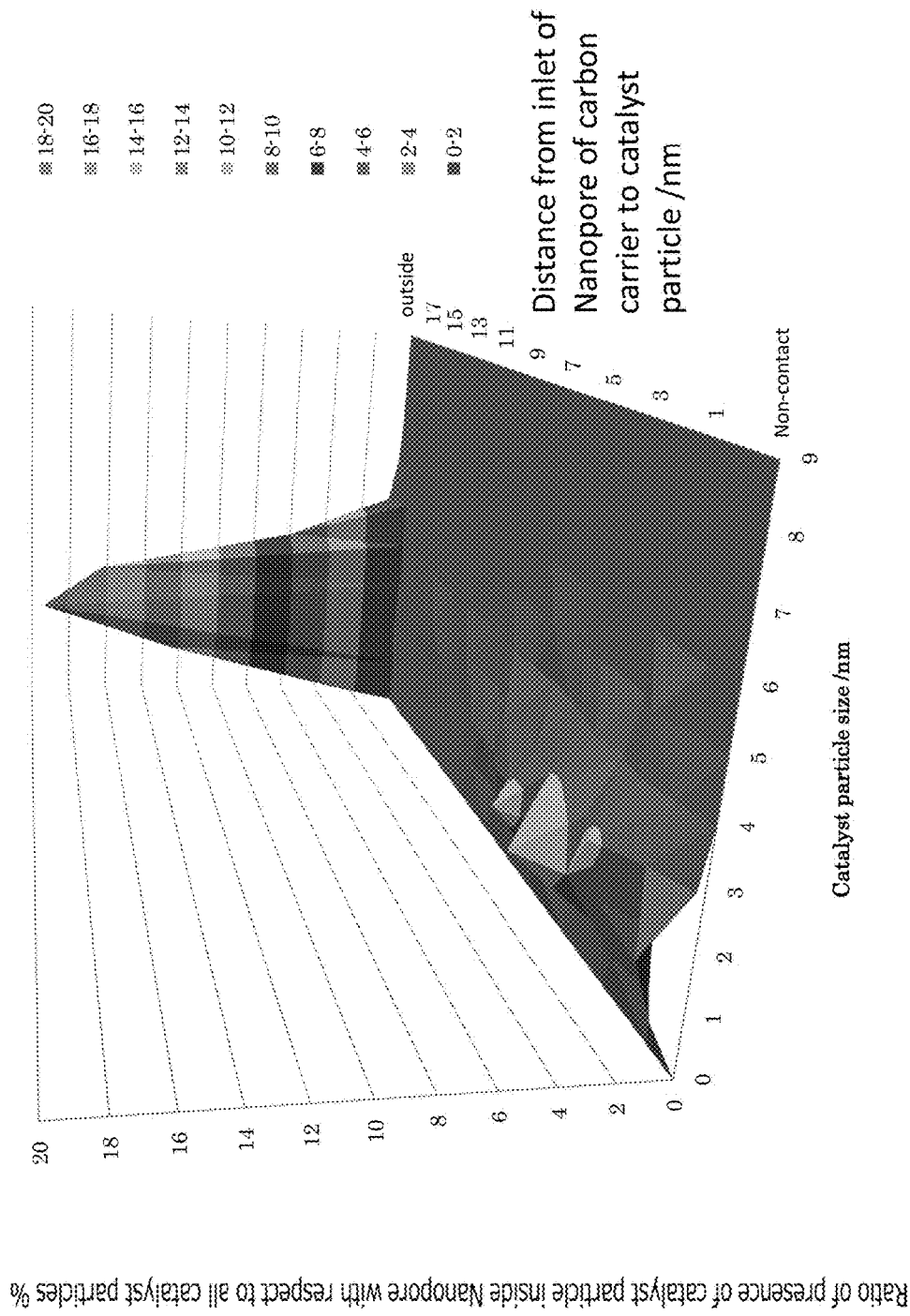
FIG. 18 is a graph showing the distribution state of Pt catalyst particle located outside and inside Nanopore of carbon carrier in the pore depth direction catalyst particles obtained by image analysis of the 3D-STEM image of the catalyst of Comparative Example 1 shown in FIG. 17.

A graph showing the distribution state of Pt catalyst particle located outside and inside Nanopore of carbon carrier in the pore depth direction catalyst particles obtained by image analysis of the 3D-STEM image of the catalyst of Comparative Example 1 shown in FIG. 17 is shown in FIG. 18.

Figure 19:
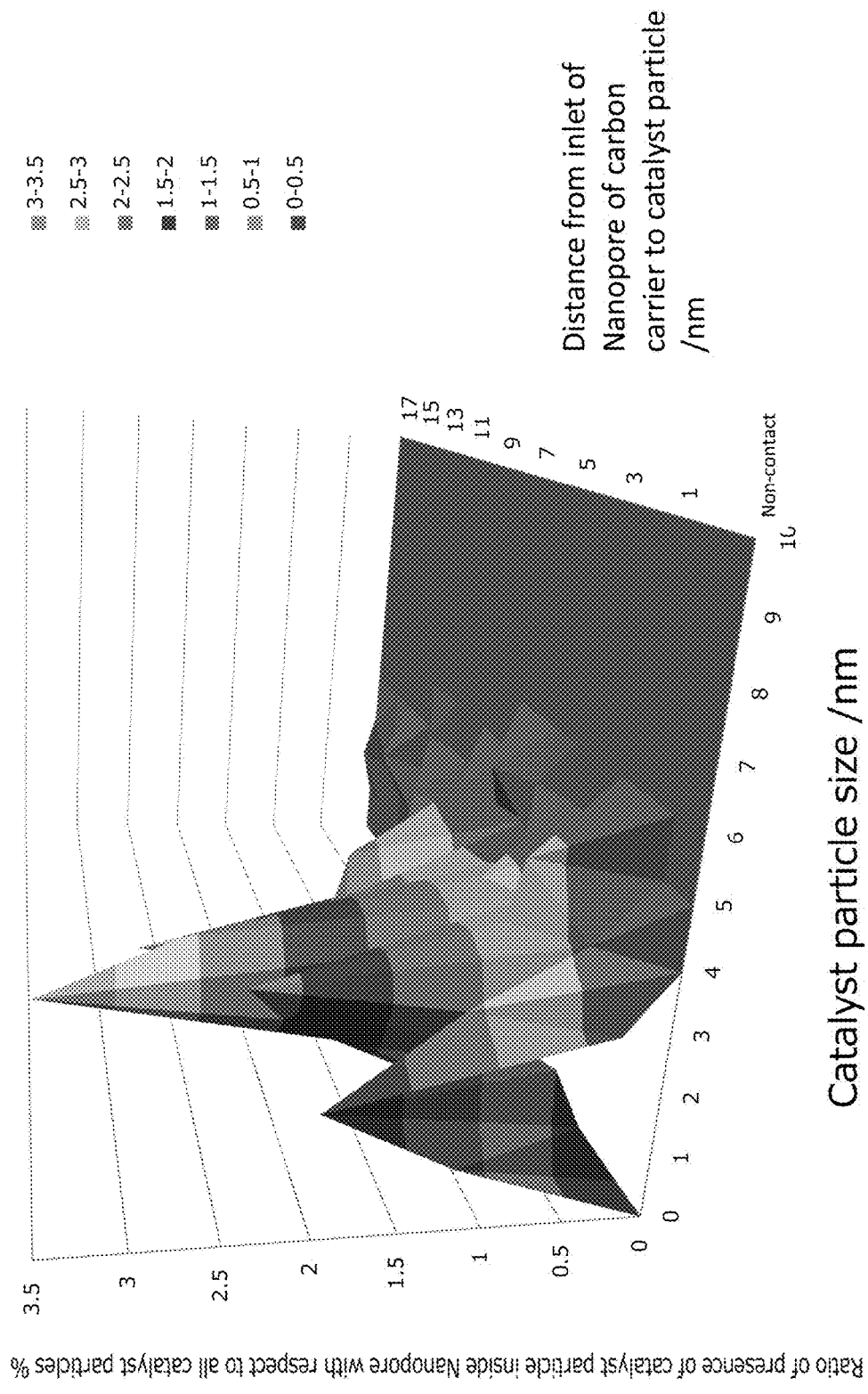
FIG. 19 is a graph showing the distribution state of Pt catalyst particle located inside Nanopore of carbon carrier in the pore depth direction catalyst particles obtained by image analysis of the 3D-STEM image of the catalyst of Comparative Example 1 shown in FIG. 17.

A graph showing the distribution state of Pt catalyst particle located inside Nanopore of carbon carrier in the pore depth direction catalyst particles obtained by image analysis of the 3D-STEM image of the catalyst of Comparative Example 1 shown in FIG. 17 is shown in FIG. 19.

A graph showing the distribution state of Pt catalyst particle located inside Nanopore of carbon carrier in the pore depth direction catalyst particles obtained by image analysis of the 3D-STEM image of the catalyst of Comparative Example 1 shown in FIG. 17 is shown in FIG. 20.

With respect to this Pt/C catalyst A, the ratio of the catalyst particles supported inside the Nanopores of the carrier and the ratio of the catalyst particles supported outside the Nanopores of the carrier were determined. The values of N10, N20, N30 were also obtained. The results are shown in Table 1 and Table 2.

In the electron tomography measurement of the electrode catalyst of Example 1, the presence of the noble metal particles of (II) described above was not confirmed. That is, there was no noble metal particle that was not in contact with the hollow carbon carrier itself and existed outside the carrier (n102=0).

Furthermore, the mean value of the particle size of the catalyst particles of the Pt/C catalyst A measured from the STEM image was 3.1 nm (the average value of the particle size of the catalyst particles inside the Nanopores: 3.1 nm, the average value of the particle size of the catalyst particles outside the Nanopores: 3.2 nm).

(II) Preparation of P/C Catalysts for Use in the Anodes of MEA of Example 1 and Comparative Example 1

The same Pt/C catalyst as Pt/C catalyst B used for the cathode of the MEA of Comparative Example 1 was used as the P/C catalyst used for the anode of the MEA of Example 1, Comparative Example 1.

Example 1

In the following procedures, an MEA with the same configuration as the MEA 10 shown in FIG. 1 was produced.

(1) Production of the Cathode

Cathode GDL

Carbon paper (trade name "TGP-H-60" manufactured by Toray Co., Ltd) was prepared as the GDL.

Ink for Forming Cathode MPL

Into a ball mill container made of Teflon (registered trademark) in which balls made of Teflon (registered trademark) were added, 1.5 g of carbon powder (trade name "Denkablack" manufactured by Electrochemical Industry Co., Ltd.), 1.1 g of ion-exchanged water, and 6.0 g of a surfactant (trade name "Triton" (35 wt % water solution) manufactured by Dow chemical Co., Ltd.) were charged and mixed.

Next, 1.75 g of polytetrafluoroethylene (PTFE) dispersion (trade name "31-JR" manufactured by Mitsui DuPont Fluorochemical Co., Ltd.) was put into the ball mill container and mixed. Thus, an ink for forming cathode MPL was produced.

Cathode MPL

On one side of the GDL, an ink for forming cathode MPL was applied using a barcoder to form a coating film. Thereafter, the coating film was sufficiently dried in a dryer, and further subjected to a heat and pressure bonding treatment to prepare a laminate in which the MPL was formed on the GDL.

Ink for Forming Cathode Catalyst Layer

Into a ball mill container made of Teflon (registered trademark) containing a ball made of Teflon (registered trademark), the above-mentioned Pt/C catalyst A, ion-exchanged water, a 10 wt % Nafion aqueous dispersion (trade name "DE1021CS" manufactured by DuPont Co., Ltd.) and glycerin were charged and mixed to prepare an ink for forming cathode catalyst layer. Note that this ink was adjusted to have a N/C=0.7. Further, the core-shell catalyst A was adjusted to have carbon:ion-exchanged water:glycerin=1:10:0.8 (mass ratio).

Cathode Catalyst Layer (CL)

An ink for forming cathode catalyst layer described above was applied to the surface of the MPL of a laminate in which MPL was formed on MPL on the GDL described above by a bar coating method to form a coating film. This coating film was dried at room temperature for 30 minutes, and then dried at 60° C. for 1.0 hours to obtain a catalyst layer. In this way, a cathode which is a gas diffusion electrode was prepared. Note that the supporting amount of Pt supported on the catalyst layer of the cathode was set to be a numerical value shown in Table 1.

(2) Production of Anode

Anode GDL

As the GDL, carbon paper identical to that of the cathode was prepared.

Ink for Forming Cathode MPL

Into a ball mill container made of Teflon (registered trademark) in which balls made of Teflon (registered trademark) were added, 1.5 g of carbon powder (trade name "Denka black" manufactured by Electrochemical Industry Co., Ltd.), 1.0 g of ion-exchanged water, and 6.0 g of a surfactant (trade name "Triton" (35 wt % water solution) manufactured by Dow chemical Co., Ltd.) were charged and mixed.

Next, 2.5 g of a polytetrafluoroethylene (PTFE) dispersion (trade name "31-JR" manufactured by Mitsui DuPont Fluorochemical Co., Ltd.) was charged into the ball mill container and mixed. Thus, an ink for forming anode MPL was produced.

Anode MPL

The ink for forming anode MPL was applied to one side of the GDL using a barcoder to form a coating film. Thereafter, the coating film was sufficiently dried in a dryer, and further subjected to a heat and pressure bonding treatment to produce a laminate in which MPL was formed on the GDL.

Ink for Forming Anode Catalyst Layer

Into a ball mill container made of Teflon (registered trademark) in which balls made of Teflon (registered trademark) were added, SA50BK (Pt supporting ratio 50 wt %), ion-exchange water, 5 wt % Nafion alcohol dispersion (trade name "Nafion" 5 wt % dispersion, product number 274704, manufactured by SIGMA-ALDRICH's) and glycerin were charged and mixed to prepare an ink for forming anode catalyst layer. Note that this ink was adjusted to have N/C=1.2. Further, SA50BK was adjusted to have carbon:ion-exchanged water:glycerin=1:6:4 (mass ratio).

Anode Catalyst Layer (CL)

An ink for forming anode catalyst layer described above was applied to the surface of an MPL of a laminate in which MPL was formed on MPL on the GDL described above by a bar coating method to form a coating film. This coating film was dried at room temperature for 30 minutes, and then dried at 60° C. for 1.0 hours to obtain a catalyst layer. In this way, an anode which is a gas diffusion electrode was produced. Note that the Pt supporting amount of the catalyst layer of the anode was set as a 0.3 mg/cm$^2$.

(3) Production of MEA

A polymer electrolyte membrane (trade name "Nafion NR212" manufactured by DuPont Co., Ltd.) was prepared. Alaminate in which this polymer electrolyte membrane was arranged between the cathode and the anode was produced, and heated and pressed by a hot pressing machine to produce an MEA. Incidentally, the hot pressing was carried out with the conditions of 140° C. at 5 KN for 5 minutes and, further, 140° C. at 25 KN for 3 minutes.

Comparative Example 1

Each MEA was produced under the same conditions and procedures as in Example 1, except that the following conditions were changed with respect to the cathode catalyst layer.

That is, in the preparation of the ink for forming cathode catalyst layer,
- the previously described P/C catalyst (trade name: "SA-50BK") was used instead of the PtIC catalyst A,
- a 5 wt % Nafion alcohol dispersion (trade name "DE520CS"; containing 48 wt % of 1-propanol manufactured by DuPont Co., Ltd.) was used instead of 10 wt % Nafion aqueous dispersion,
- the composition of the ink for forming cathode catalyst layer and the applying conditions of the ink were adjusted so that the Pt supported amount and the N/C had the numerical values shown in Table 1.
- carbon:ion-exchanged water:glycerin=1:10:1 (mass ratio) in the P/C catalyst (trade name: "SA50BH").

<Cell Performance Evaluation>

The cell performance of the MEA of Example 1 and Comparative Example 1 was carried out by the following cell performance evaluation method.

The MEA of Example 1 and Comparative Example 1 were installed in a fuel cell unit cell evaluation device.

Next, the power generation reaction in the MEA was allowed to proceed under the following conditions.

The temperature of the unit cell (MEA) was set to 80° C. The anode was supplied with pure hydrogen humidified with saturated water vapor of 1.0 atm by adjusting the flow rate so that the utilization rate was 70%. Further, the cathode was supplied with pure oxygen humidified with saturated water vapor of 1.0 atm at 80° C. by adjusting the flow rate so that the utilization rate was 50%.

Evaluation of the unit cells (MEA) was performed by controlling the current by an electronic loading device attached to the fuel cell unit cell evaluation device, and the current-voltage curves obtained by scanning the current values from 0 to 1.0 A/cm$^2$ were acquired as data.

The X-axis (current density) from the data of the current-voltage curves was plotted as a logarithmic scale to obtain a graph (not shown), and a current density value at a voltage 850 mV (current value per unit area of the electrode) was obtained.

By dividing the current density value thus obtained by the platinum weight per unit area of the cathode, it was calculated as the activity per unit weight (Mass.Act.) for platinum contained in the cathode, and was used as an indicator of the oxygen reduction ability of the catalyst contained in the cathode. The results are shown in Table 1.

In Table 1, a result of comparing Mass.Act. obtained in the other examples and comparative examples as a relative value (relative ratio) using Mass.Act. obtained in Comparative Example 1 as a reference (1.0) is shown.

TABLE 1

|  | Structure of catalyst for electrode of cathode | Carrier of catalyst for electrode of cathode | Ratio of catalyst particles supported inside nanopore of carrier of catalyst for electrode of cathode 29 | Relative value of Mass. Act. @850 mV | Pt supporting amount of cathode g/cm$^2$ | Pt supporting amount of anode g/cm$^2$ |
|---|---|---|---|---|---|---|
| Ex. 1 | Pt/C | Carbon ECP | 76 | 1.7 | 0.10 | 0.30 |
| Com. Ex.1 | Pt/C | Carbon ECP | 43 | 1.0 | 0.10 | 0.30 |

TABLE 2

|  | Ratio of [non-contact particle] to catalyst particle supported inside Nanopore of electrode catalyst carrier (N10/N20)/% | Ratio of [non-contact particle] to all catalyst particles supported on electrode catalyst carrier [N10/(N20 + N30)]/% | Average distance from inlet of nanopore of electrode catalyst carrier to supporting position of catalyst particle /nm |
|---|---|---|---|
| Ex. 1 | 7.6 | 5.8 | 10.80 |
| Com. Ex. 1 | 8.3 | 3.6 | 5.6 |

From the results shown in Table 1 to Table 2, it was clarified that the MEA of Example 1 has a high Pt mass activity compared with the MEA of Comparative Example 1.

INDUSTRIAL APPLICABILITY

The electrode catalyst of the present invention exhibits excellent catalytic activity. In addition, the GDE, CCM, MEA, and fuel cell stack including the catalyst layer of the present invention exhibit excellent cell properties that can contribute to cost reduction of PEFC.

Therefore, the present invention can be applied not only to the electrical equipment industry such as a fuel cell, a fuel cell vehicle and a portable mobile but also to ENE-FARM, a cogeneration system and the like and, therefore, contributes to the development of energy industry and environmental technology.

EXPLANATION OF NUMERALS

1 . . . : cathode,
1A, 1B, 1C: : gas diffusion electrode (GDE)
1c . . . : catalytic layer (CL),
1m . . . : water repellent layer (MPL),
1gd . . . : gas diffusion layer (GDL),
2 . . . : anode,
2c . . . : catalytic layer (CL),
2m . . . : water repellent layer (MPL),
2gd . . . : gas diffusion layer (GDL),
3 . . . : Polymer electrolyte membrane (PEM),
4, 5 . . . : separator
10, 11 . . . : membrane-electrode assembly (MEA),
12, 13 . . . : membrane catalyst layer assembly (CCM)
20 . . . : Pt/C catalyst,
22 . . . : carrier,
23 . . . : catalyst particle,
30 . . . : fuel cell stack,
P22 . . . : Nanopores of the carrier

The invention claimed is:

1. An electrode catalyst which includes a conductive hollow carbon carrier having a Nanopore of a pore size of 1 to 20 nm, and a plurality of catalyst particles supported on the carrier, wherein
the catalyst particle is composed of Pt (0 valent),
the catalyst particle is supported on both of inside of the Nanopore and outside the Nanopore of the carrier, and
when an analysis of a particle size distribution of the catalyst particles is performed by using a three-dimensional reconstructed image obtained by an electron beam tomography measurement using an STEM (scanning transmission electron microscopy), the condition of the following equation (S1) is satisfied:

$$100 \times (N10/N20) \leq 8.0 \tag{S1}$$

in the above equation (S1),
N10 is the number of non-contact particles (n101+n102), which is the sum of the number of particles (n101) of noble metal particles that are not in contact with pores having a pore diameter of 1 nm or more that can be confirmed by the electron tomography measurement and the number of noble metal particles (n102) that are not in contact with the hollow carbon carrier itself and exist outside the hollow carbon carrier,
N20 is the number of particles of the catalyst particles supported inside the Nanopores of the carrier.

2. The electrode catalyst according to claim 1, wherein, when an analysis of a particle size distribution of the catalyst particles is performed by using a three-dimensional reconstructed image obtained by an electron beam tomography measurement using an STEM (scanning transmission electron microscopy), the condition of the following equation (S2) is satisfied:

$$100 \times \{N10/(N20+N30)\} \leq 6.0 \tag{S2}$$

in the formula (S2),
N10 is synonymous with N10 in the formula (S1),
N20 is synonymous with N20 in the formula (S1),
N30 is the number of particles of the catalyst particles supported on the outside of the Nanopores of the carrier.

3. The electrode catalyst according to claim 1, wherein, when an analysis of a particle size distribution of the catalyst particles is performed by using a three-dimensional reconstructed image obtained by an electron beam tomography measurement using an STEM (scanning transmission electron microscopy),
with respect to the catalyst particles supported inside the Nanopore of the carrier,
an average distance from the inlet of the Nanopores to the supported position of the catalyst particles is of 6.0 nm or more.

4. The electrode catalyst according to claim 1, wherein, when an analysis of a particle size distribution of the catalyst particles is performed by using a three-dimensional reconstructed image obtained by an electron beam tomography measurement using an STEM (scanning transmission electron microscopy),
the catalyst particles supported inside the Nanopore of the carrier exist within a range that a distance from the inlet of the Nanopore to the supported position of the catalyst particles of 0 to 24 nm.

5. The electrode catalyst according to claim 1, wherein,
when an analysis of a particle size distribution of the catalyst particles is performed by using a three-dimensional reconstructed image obtained by an electron beam tomography measurement using an STEM (scanning transmission electron microscopy),
a particle size of the catalyst particles supported inside the Nanopore of the carrier is more than 0 nm and 4 nm or less.

6. The electrode catalyst according to claim 1, wherein,
when an analysis of a particle size distribution of the catalyst particles is performed by using a three-dimensional reconstructed image obtained by an electron beam tomography measurement using an STEM (scanning transmission electron microscopy),
a ratio of the catalyst particles supported inside the Nanopore is 50% or more.

7. The electrode catalyst according to claim 6, wherein,
when an analysis of a particle size distribution of the catalyst particles is performed by using a three-dimensional reconstructed image obtained by an electron beam tomography measurement using an STEM (scanning transmission electron microscopy),
a ratio of the catalyst particles supported inside the Nanopore is 70% or more.

8. The electrode catalyst according to claim 1, wherein at least a part of the surface of the catalyst particles is covered with a Pt oxide film.

9. The electrode catalyst according to claim 1. wherein the hollow carbon carrier has a BET specific surface area (nitrogen adsorption specific surface area) of 200 to 1500 $m^2/g$.

10. The electrode catalyst according to claim 9, wherein the hollow carbon carrier is Ketjen EC300J.

11. A powder of a electrode catalyst, which contains 10 wt % or more of the electrode catalyst according to claim 1.

12. A composition for forming a gas diffusion electrode, which contains the electrode catalyst according to claim 1 or a powder of the electrode catalyst.

13. A gas diffusion electrode, which contains electrode catalyst according to claim 1 or a powder of the electrode catalyst.

14. A membrane-electrode assembly (MEA), which comprises the gas diffusion electrode according to claim 13.

15. A fuel cell stack, which comprises the membrane-electrode assembly (MEA) of claim 14.

* * * * *